US005623626A

United States Patent [19]
Morioka et al.

[11] Patent Number: 5,623,626
[45] Date of Patent: Apr. 22, 1997

[54] LOGICAL CACHE MEMORY FOR MULTI-PROCESSOR SYSTEM

[75] Inventors: Michio Morioka, Hitachi; Tadaaki Bandoh, Tohkai-mura; Masayuki Tanji, Hitachi, all of Japan

[73] Assignee: Hitachi, Ltd., Tokyo, Japan

[21] Appl. No.: 440,692

[22] Filed: May 15, 1995

Related U.S. Application Data

[63] Continuation of Ser. No. 293,335, Aug. 24, 1994, abandoned, which is a continuation of Ser. No. 41,873, Apr. 2, 1993, abandoned, which is a continuation of Ser. No. 159,222, Feb. 13, 1988, abandoned.

[30] Foreign Application Priority Data

Feb. 27, 1987 [JP] Japan ................................ 62-42962
Dec. 7, 1987 [JP] Japan ................................ 62-307551

[51] Int. Cl.⁶ .................................................. G06F 12/10
[52] U.S. Cl. ........................ 395/445; 395/412; 395/403; 395/800; 364/243.41; 364/255.1; 364/DIG. 1
[58] Field of Search ................................ 395/425, 445, 395/412, 403, 800; 364/243.41, 255.1, DIG. 1

[56] References Cited

U.S. PATENT DOCUMENTS

| | | | |
|---|---|---|---|
| 3,761,881 | 9/1973 | Anderson | 364/200 |
| 4,453,230 | 6/1984 | Mizoguchi et al. | 395/400 |
| 4,467,414 | 8/1984 | Akagi et al. | 364/200 |
| 4,564,900 | 1/1986 | Smitt | 364/200 |
| 4,602,368 | 7/1986 | Circello et al. | 364/900 |
| 4,612,612 | 9/1986 | Woffinden et al. | 364/200 |
| 4,622,631 | 11/1986 | Frank et al. | 364/200 |
| 4,633,387 | 12/1986 | Hartung et al. | 364/200 |
| 4,727,482 | 2/1988 | Roshon-Larsen et al. | 364/200 |
| 4,740,889 | 4/1988 | Matersole et al. | 364/200 |
| 4,763,244 | 8/1988 | Moyer et al. | 364/200 |
| 4,797,817 | 1/1989 | Nguyen et al. | 364/200 |
| 4,843,542 | 6/1989 | Dashiell et al. | 364/200 |
| 4,991,081 | 2/1991 | Bosshart | 395/425 |

FOREIGN PATENT DOCUMENTS

| | | |
|---|---|---|
| 25457 | 7/1978 | Japan . |
| 79446 | 5/1985 | Japan . |
| 246850 | 11/1986 | Japan . |

OTHER PUBLICATIONS

*Computing Services* "Cache Memories" by Smith, vol. 14, No. 3, Sep. 1982, pp. 510–511.

Primary Examiner—Meng-Ai T. An
Assistant Examiner—John Harrity
Attorney, Agent, or Firm—Antonelli, Terry, Stout & Kraus, LLP

[57] ABSTRACT

A logical cache memory has a logical tag and a physical tag as address tags for comparison, and status information representing their status. Data status and block status are registered at the same entry position. When access is made using a logical address, access is made to the logical tag to detect the existence of data, and when access is made using a physical address, access is made to the physical tag using an offset portion which does not depend on address conversion, to detect the existence of data.

3 Claims, 14 Drawing Sheets

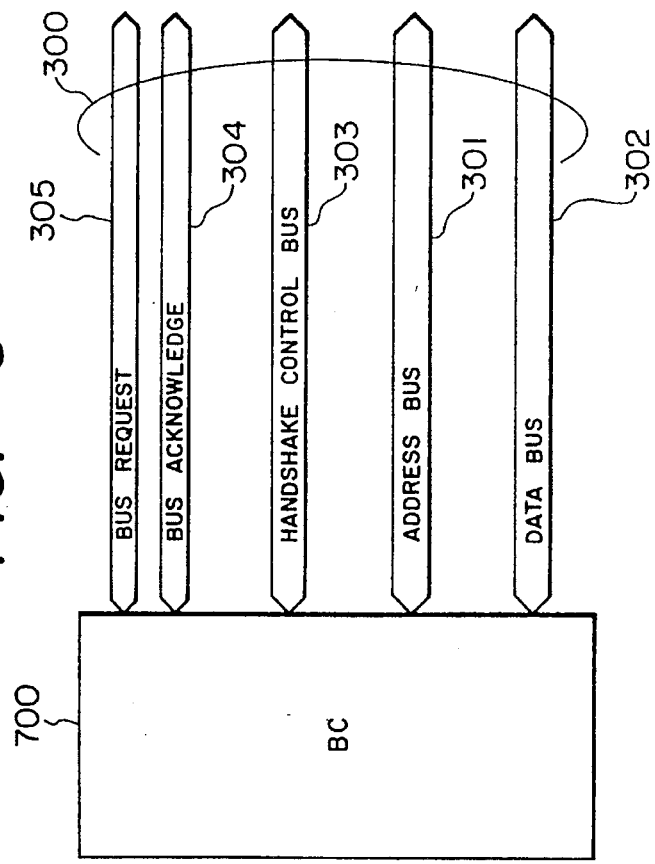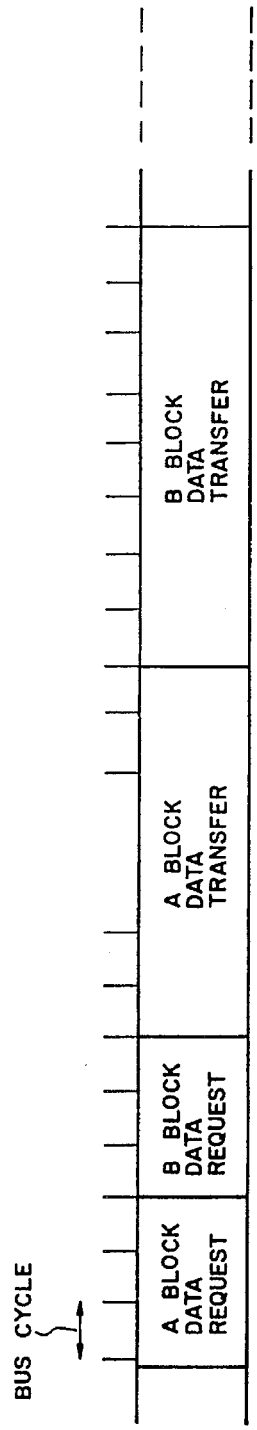

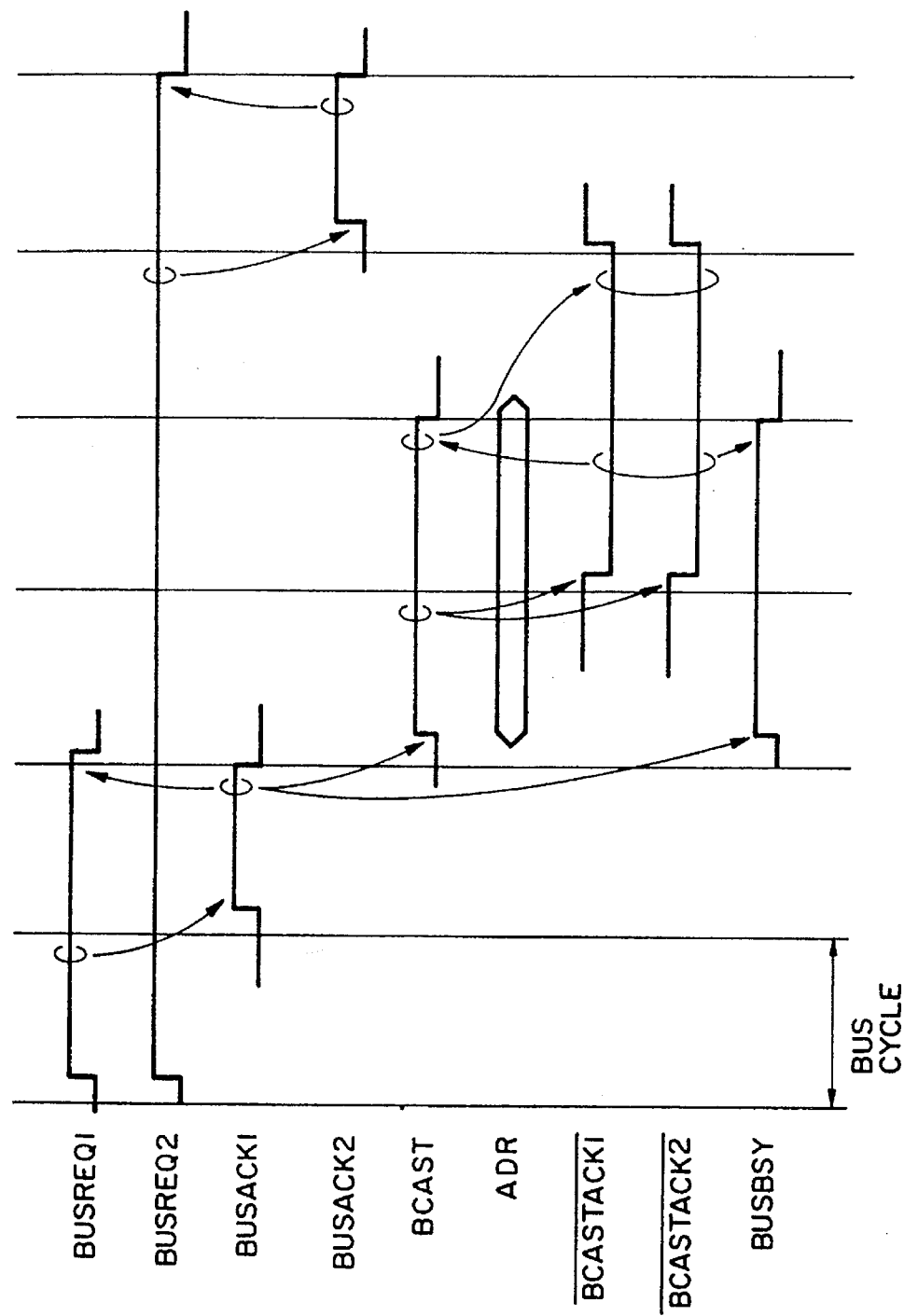

LOGICAL CACHE MEMORY FOR MULTI-PROCESSOR SYSTEM

This application is a continuation of application Ser. No. 08/293,335, filed on Aug. 24, 1994 now abandoned; which is a continuation of application Ser. No. 08/041,873, filed Apr. 2, 1993 now abandoned; which is a continuation of application Ser. No. 07/159,222, filed on Feb. 13, 1988 now abandoned.

BACKGROUND OF THE INVENTION

This invention relates generally to a data processor and more particularly a data processor having a logical cache memory which will be suitable for a multi-processor system in which a large number of arithmetic units share one main storage.

Recent computer systems are generally of the type wherein a large number of users share one computer and each user executes simultaneously a large number of processes. To comply with such a trend, a multiprocessor system in which a large number of arithmetic units share one main storage and an arithmetic unit is allotted to each process has become a common approach in place of a system in which one arithmetic unit executes a large number of processes on a time division basis.

According to the multi-processor system having such a structure, each arithmetic unit effects a memory access by use of a common bus. Therefore, bus competition will occur unless certain measures are taken to avoid the possibility that each arithmetic unit will not be allowed to exhibit fully its performance. These problems are solved by providing a local cache memory for each arithmetic unit. This cache memory is a small capacity memory and holds part of the content of the main memory and its access time is generally from about 1/5 to 1/10 of that of the main memory. If the data requested by the arithmetic unit exists inside the cache memory (this is called "cache hit"), memory access is completed within a short time and in this case, access to the common memory is not made. If the requested data does not exist inside the cache memory (this is called "cache miss"), block data of a predetermined size is transferred from the common memory to the local cache memory and the data is supplied to the requesting arithmetic unit. If such a cache memory is provided, a considerably high cache hit ratio can be obtained even from the cache memory having a small capacity due to locality of memory access and hence, almost all memory accesses are completed between the arithmetic unit and the cache memory and access to the common bus can be reduced drastically. In other words, even when a large number of processors are connected to the common bus, the frequency of bus competition is low and the effect of providing plural processors can be derived fully.

In the multiprocessor system, it is another important objective to utilize a multiple virtual storage system. As described in Japanese Patent Laid-Open No. 79446/1985, for example, the multiple virtual storage system is a system in which the logical address space starting from 0 (zero) address is allotted to each process. A greater size is allotted to the logical address space than to a physical address space representing the physical position in the main memory. Therefore, the logical address space of each process is allotted onto the main memory and in a secondary storage and only the necessary data is placed in the main memory. When the requested data does not exist in the main memory, part of the data in the main memory is swapped out (hereinafter called "swap-out") to the secondary storage and the necessary data is loaded from the secondary storage into the main memory (hereinafter called "swap-in"). According to this technique, each process can make access to the main memory and to the secondary storage as one address space.

To accomplish such a technique, the logical address space and the physical address space are managed as block data of a predetermined size which is called a "page", and swap-in and swap-out between the main memory and the secondary storage are effected in the unit of this page. Correspondence between the logical address page and the physical address page is managed by a page table. When the arithmetic unit makes a memory access, the page table is accessed using the logical address, which is converted to the physical address. In the multiple virtual storage system, such a page table is provided for each process and when the process is switched, the page table to be referred to is switched, too. In this manner, it becomes possible to allot the logical address space from the 0 address for each process. Since the page table is placed in the main memory, the overhead of the memory access is great if the page table on the main memory is referred to whenever memory access is made. Therefore, the set of the logical address page which is recently converted and the physical address page is stored in a buffer memory called "TLB" (Translation Look-aside Buffer), and when the TLB hits, address conversion can be made at a high speed without requesting access to the page table in the main memory.

The above is a summary of a multiprocessor system. Next, the use of a cache memory in such a system will be explained. Two systems are available for access to the cache memory. One is a logical cache memory in which access is made to the cache memory using the logical address before address conversion by the TLB and the other is a physical cache memory in which access is made to the cache memory using the physical address after address conversion by the TLB. In the physical cache memory, address conversion by the TLB is necessary whenever memory access is to be made, and this invites an increase in the memory access time. In the logical cache memory, on the other hand, address conversion by the TLB is not necessary so long as the cache memory hits, and the address conversion must be made only at the time of block transfer from the common memory when the cache memory miss. Accordingly, the memory access time can be shortened drastically.

In the arithmetic unit, the cache memory is often divided into areas for instructions and for data in order to improve memory through-put. When the physical cache memory is employed in such a structure, TLBs must be disposed for instructions and for data, respectively. In accordance with the logical cache memory, it is possible to share the TLB between the instruction cache and the data cache, and a reduction of hardware quantity can be achieved.

On the other hand, when the logical cache memory is employed, it will be possible to employ a structure wherein a bus that is shared commonly by a large number of processors is used as the logical address bus (hereinafter called "logical common bus") and a structure wherein it is used as a physical address bus (hereinafter called the "physical common bus"). In the logical common bus structure an address convertor is disposed on the side of the common memory and is shared by each arithmetic unit. In the physical common bus structure, on the other hand, an address convertor is provided for each arithmetic unit. The logical common bus structure has the advantage that the hardware quantity can be reduced because the TLB can be shared. When the number of processors connected to the bus increases, however, access concentrates on the TLB with the change of the page table and this might become a bottle neck in the system. In addition, main memory access from the I/O processors with swap-in and swap-out of the pages is made by using the physical address. Therefore, according to the logical common bus structure, a conversion table is necessary in order to convert the physical address from the I/O processors to the logical address.

For the reasons described above, the physical common bus structure by use of the logical cache memory is believed suitable for the memory system of a multiprocessor system.

Another problem of the cache memory is coincidence assurance of the memory content of each cache memory. In a multiprocessor system wherein a local cache memory is provided for each processor, it is of utmost importance to assure data coincidence for the various cache memories. Let's consider the case, for example, where certain data in the common memory is shared by the local cache memories of the arithmetic units A and B. If the arithmetic unit A updates the shared data but does not report updating to the cache memory of the arithmetic unit B, and if the arithemtic unit B makes access to this data, then the cache memory in its own unit hits and the wrong data is read. To solve this problem, each unit must report updating to all the other arithmetic units when it updates the data. Each arithmetic unit must have means for monitoring the common bus, to detect the report of data updating and manage coincidence assurance of each cache memory.

The protocol of cache memory coincidence assurance varies with the write access processing system of the cache memory. The write access processing system of the cache memory may be a store-through system or a store-swap system. The former is a system which updates the contents of the cache memory and of the main memory whenever write access from the arithmetic unit occurs. Therefore, the contents of the cache memory and of the main memory are always coincident. In the store-swap system, on the other hand, if the write access hits the cache memory, processing is completed only by updating the data in the cache memory. Updating of the main memory is effected for the first time when the block containing the updated data is put out from the cache memory. For this reason, the contents of the cache memory and of the main memory are not always coincident.

An example of the coincidence assurance protocol of the cache memory in each write access processing system will be given next. Since the contents are always coincident between the cache memory and the main memory in the store-through system, the writing of data from one processor to the main memory is reported to all the other processors. Each processor monitors the transaction on the common bus and when it detects a writing to the main memory, it checks whether or not the data corresponding to that address exists in the local cache memory. If the corresponding data exists, the block containing it is nullified. On the other hand, the coincidence assurance protocol in the store-swap system is more complicated than the store-through system. Though various coincidence assurance protocols have been proposed, only one example will be given herebelow.

The following three states can exist in a block of the cache memory.
(1) Shared . . . The block is coincident with the memory content of the main memory and is shared by a plurality of cache memories.
(2) Exclusive . . . The block is coincident with the content of the main memory and exists in only one cache memory.
(3) Owned . . . The block is not coincident with the content of the main memory and exists in only one cache memory.

Next, processing when the arithmetic unit makes access to the block under each of the states described above will be explained.
(i) Read hit:
The data is read out irrespective of the state of the block.
(ii) Read miss:
Block transfer is requested to the common memory. At this time, whether or not any block under transfer exists in other cache memories is inspected and if it does, it is written as a Shared block into its own cache memory and if it does not, it is written as an Exclusive block. Thereafter, read access that has been suspended is started again.
(iii) Write hit:
In the write operation into the Shared block, writing is made to the corresponding cache memory and at the same time, data updating is reported to the other cache memories through the common bus. Thereafter, the state of the block becomes "Owned". In the write operation to the Exclusive and Owned blocks, it is not necessary to report updating to the other cache memories.
(iv) Write miss:
Block transfer is requested to the common memory. At this time, whether or not any block under transfer exists in the other cache memories is inspected and if it exists, it is written as the Shared block and if it does not, as the Exclusive block, into its own cache memory. Thereafter, the write access that has been suspended is started again.

In the coincidence assurance protocol of the store-swap system described above, each arithmetic unit has a monitor for checking the transaction on the common bus and executes the following processing.
(i) When a block transfer transaction is detected on the common bus:
If the corresponding block exists in its own cache memory and if the state of the block is "Owned", the block transfer request on the common bus is aborted and the Owned block in its own cache is written back to the common memory so as to change it to "Exclusive". Thereafter, the block transfer request that has been suspended is started again. If the state of the corresponding block is either Shared or Exclusive, existence of that block inside its own cache memory is reported through the common bus. Thereafter, the state of the block becomes Shared.
(ii) When a data updating report is detected on the common bus:
If the corresponding block exists in its own cache memory, that block is nullified.

In accordance with the following protocol, coincidence of cache memories when the store-swap system is employed can be assured. This cache memory coincidence assurance is necessary not only for the multiprocessor system, but also for the uniprocessor system. In other words, if the arithmetic units and the I/O processors are connected onto the physical bus, coincidence assurance is necessary for the cache memories that the arithmetic units have.

The description given above states that the structure suitable for a multiprocessor system is the logical cache memory and the physical common bus and coincidence assurance of the dispersed cache memories is also described. However, the prior art technique described above involves several other problems.

First of all, the problem that occurs in the case of a single processor will be described. In a computer system employing a multiple virtual storage system, the logical address space starting from the zero (0) address is allotted to each process and for this reason, it is sometimes necessary for the same logical address to refer to different physical data. In the conventional logical cache systems, therefore, the process of purging all the logical cache contents whenever processes are switched is executed in order to prevent the process under execution from making access to the data of the same logical address of the other processes. If a task switch occurs frequently, there occurs the problem that the effect of advantage of the cache memory drops. When the cache memory of the store-swap system is employed, it is necessary to copy back the block containing the updated data to the main memory before the purge processing of the cache memory.

This problem can be solved by providing a process identifier in the comparison address of the logical cache memory as described in Japanese Patent Laid-Open No. 79446/1985. In other words, when the logical cache memories are accessed, comparison is made on the basis of not only the logical address but also the process identifier. This method eliminates the necessity of purging the content of the cache memory for each task switch.

When this system is employed, however, another new problem develops. Namely, the problem of "Address Synonym" occurs. This problem can occur when each process shares its data. When the processes share data between them, different logical address pages are mapped to the common physical address under the management of the page table of each process. Accordingly, the same data can exist at different entry positions in the cache memory accessed by the same logical address. If a certain process updates the common data under such a situation, the common data of the other processes remain as such in the cache memory and if the other processes make access to the common data, the wrong data is supplied from the cache memory. Means for coping with this "Address Synonym" has conventionally been discussed in the reference "Computing Surveys", Vol. 14, No. 3, September 1982, pp. 510–511. This method includes a table for inversely converting the physical address page to the logical address page. The inverse conversion table is one that holds all the logical address pages mapped to the physical address page of the data existing inside the logical cache for the physical address page. When a certain process updates the common data in this system, the logical address is converted to a physical address by the TLB and then access is made to the inverse conversion table by the physical address. As a result, if the common data of other processes exists inside the cache memory, updating or nullification is made for that data. According to this prior art technique, however, a table for inversely converting the physical address to the logical address is necessary so that the hardware quantity increases and management of the inverse conversion table is complicated.

Another method of solving the problem is discussed in Japanese Patent Laid-Open No. 246850/1986. This prior art reference includes a first directory for storing the logical address information as the address information stored in the logical cache memory and a second directory for storing the actual address information and part of the logical address information. The logical address information and the actual address information are registered to different column addresses of each directory and the relationship between them is determined on the basis of link information stored in the second directory. This system (which will be hereinafter called the "link bit system") will be explained briefly with reference to FIG. 10.

In FIG. 10, reference numerals 901 and 902 represent registers to which the logical address and the physical address are set, respectively, and an address conversion unit 900 converts bits 0–19 of the logical address to bits 0–19 of the physical address. The cache memory consists of a logical directory 903 for storing the logical address information, a data unit 904 for storing data and a physical directory 905 for storing the physical address information. A tag portion of the logical address (bits 0–17) 910 (LAR) corresponding to the data stored in the data unit 904 and the effective bit 911 (V) are registered in the logical directory 903. In this example, the logical directory 903 and the data unit 904 use the bits 18–31 of the logical address 901 as the column address. On the other hand, the column address 913 (hereinafter called the "link bit (LNK)", to which a tag portion of the physical address (bit 0–17) 912 (PAR) corresponding to the data, the effective bit 914 (V) and a logical address tag corresponding to the physical address tag, is registered in the physical directory 905. In this example, the physical directory 905 uses the bits 18–31 of the physical address 902 as the column address. Therefore, the logical address tag 910 and the corresponding physical address tag 912 are not always registered in the same column of each directory.

When the link bit system is employed, the problem of "Address Synonym" can be solved in the following way. If the data shared by the processes exists in the cache and when a write request is issued by a processor to one of the logical addresses, access is first made to the logical directory 903 and the data is written into the corresponding entry. Then, the logical address 901 is converted to the physical address 902 by the address conversion unit 900. Next, access is made to the physical directory 905 using the physical address 902, and the column address of the corresponding data portion 904 is generated by the link information 913 of the hit column Write or nullification is made to this column. The operation described above assures coincidence of the common data. This link bit system is discussed in Japanese Patent Laid-Open No. 25457/1978, too.

However, this link bit system involves the problem that when the data is shared by a plurality of processes, a plurality of link information are necessary for one entry of the physical directory and management becomes complicated.

Next, the problem that occurs in the case of the multiprocessor system will be described. The problem lies in that the function of converting the physical address to a logical address is necessary in order to assure the coincidence of all of the cache memories. As described already, the function of monitoring the common bus for each processor is necessary in order to assure the coincidence of the various cache memories. Though the monitor function has already been described, it is necessary to detect the transaction on the bus to retrieve inside its own cache memory, to nullify if the corresponding block exists and to abort the transaction on the common bus and to execute copy-back processing. According to the structure of the physical common bus by the logical cache memories, however, it is necessary to input the address on the common bus by the monitor, to convert it first to the logical address and then to access the logical cache because the transaction on the common bus is effected by using the physical address. Therefore, an inverse conversion table becomes necessary for converting the physical address to the logical address, so that hardware quantity increases and management of the inverse conversion table becomes complicated.

On the other hand, the inverse conversion table becomes unnecessary if the afore-mentioned link bit system is employed. In FIG. 10, the physical address on the common bus is taken into the physical address register 902 by the monitor. The access is made to the physical directory 905 using this physical address and if the corresponding entry exists, the corresponding data and the column address of the logical directory are generated from the link information 913 and nullification is executed. However, as described already, when a plurality of processes share the data, a plurality of link information become necessary and management becomes complicated.

SUMMARY OF THE INVENTION

It is therefore a first object of the present invention to provide a logical cache memory which can solve the problem of "Address Synonym" that occurs when different logical addresses share the same physical data and can assure coincidence of the logical cache memory corresponding to each processor without using an inverse conversion table for converting the physical address to the logic address, and also a data processor using such logical cache memories.

It is a second object of the present invention to provide a logical cache memory which can solve the problem of "Address Synonym" when different logical addresses share the same physical data and can assure coincidence of logical cache memories that are dispersedly disposed for a plurality of processors without using link information representing the correspondence between a logical directory and a physical directory, and also a data processor using such cache memories.

It is a third object of the present invention to provide a logical cache memory which can solve the problem of "Address Synonym" and can assure coincidence of dispersed logical caches without increasing the associative number of the logical cache even when the capacity of the logical cache increases, and also a data processor using such logical cache memories.

The most characterizing feature of the present invention resides in the provision of a logical cache memory which has a logical tag and a physical tag as its comparison address tags and registers status information representing the status of both the tags, and the status of the data and that of the block is registered to the same entry position.

In the present invention, when access is made using the logical address, access is made to the logical tag and the existence of data is detected and when access is made using the physical address, access is made to the physical tag in parallel using an offset portion which does not depend on address conversion to detect the existence of the data.

The above and other objects and novel features of the present invention will become more apparent from the following description of embodiments thereof when taken in conjunction with the accompanying drawings.

BRIEF DESCRIPTION OF THE DRAWINGS

FIG. 3 shows the structure of a common bus;

FIG. 4 is an explanatory view of a split system of the common bus;

FIG. 5 is a time chart showing the bus operation of broadcast;

DESCRIPTION OF THE PREFERRED EMBODIMENTS

Figure 2:
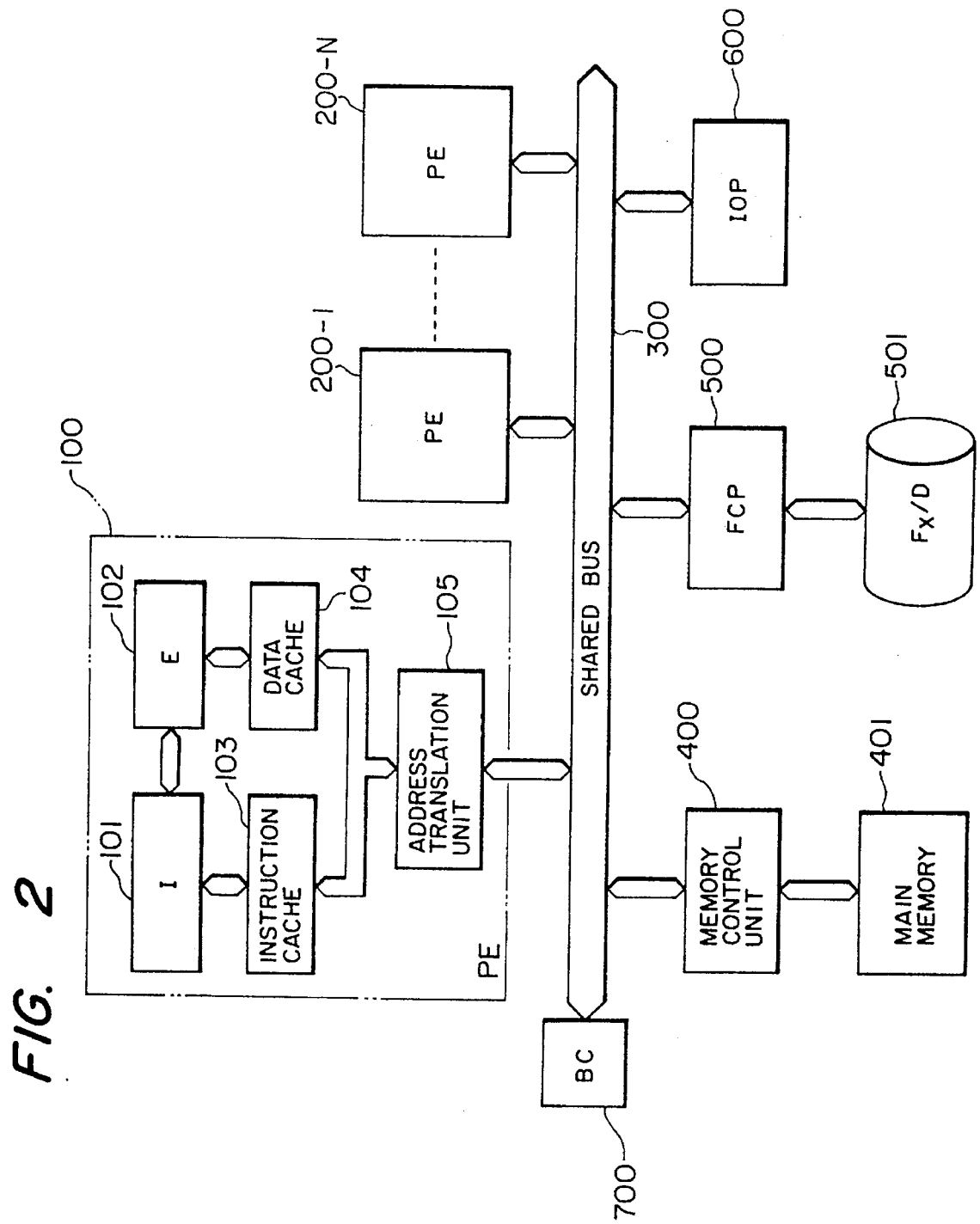
FIG. 2 shows the overall construction of a multiprocessor system.

FIG. 2 shows one embodiment of a data processor to which the present invention is applied. In the drawing, arithmetic units 100, 200, 300 connected to a common bus 300 share a main memory 401 and a memory controller 400 makes access control of the main memory 401 and supplies data to a plurality of arithmetic units. A file control processor 500 transfers at a high speed an arbitrary file stored inside a fixed disk 501 to the main memory 401. An input/output (I/O) processor 600 makes data transfer with an external input/output (I/O) device. The common bus 300 is controlled by a bus controller 700.

An instruction fetch unit (I) 101 inside the arithmetic unit 100 (with the others being the same) has the function of fetching an instruction necessary for execution of a program from the main memory 401. The instruction thus fetched is transferred to an instruction execution unit (E) 102. The instruction execution unit 102 decodes the instruction, fetches the necessary data and then executes the calculation. An instruction cache memory 103 copies the instruction inside the main memory 401 and stores it in a high speed buffer memory. When the instruction fetch unit 101 makes access to the instruction cache memory 103 using a logical address, the requested instruction is fetched rapidly if it exists inside data cache memory. The data cache memory 104 copies the instruction inside the main memory 401 and stores it in a high speed buffer memory. When the instruction execution unit 102 makes access to the data cache memory 104 using a logical address, the requested data is fetched rapidly if it exists inside the data cache memory 104. If the instruction or data requested for the instruction or data cache memory 103 or 104 does not exist, the logical address is transferred to an address convertor 105. After converting the logical address to the physical address, the address convertor 105 requests data transfer to the memory controller 400 through the common bus 300. The data that has been transferred from the main memory 401 is first written into the instruction or data cache memory 103 or 104 and is then supplied to the instruction unit 101 or to the instruction execution unit 102.

Next, the structure of the common bus 300 will be explained with reference to FIG. 3. The common bus 300 includes a hand-shake control bus 303 as the bus shared by each arithmetic unit, an address bus 301 and a data bus 302. In this embodiment, the address bus has 29 bits while the data bus 302 has 64 bits. In order to avoid bus competition by the arithmetic units, a bus occupation request line 305 is disposed from each arithmetic unit to the bus controller 700 and a bus use permission line 304 is disposed individually for each arithmetic unit from the bus controller 700.

As shown in FIG. 4, on the other hand, a split system is employed for the common bus 300. Namely, the internal or empty time from the generation of transfer request of the A block from a certain arithmetic unit to the transfer of the A block by the main memory controller 400 can be used by the other arithmetic units. In order to accomplish this split system, the bus occupation request line 305 and the bus use permission line 304 are also disposed in the main memory controller 400. The bus occupation request lines from the arithmetic units and from the main memory controller are connected to the bus controller 700 and the bus controller 700 generates a bus use permission signal for each arithmetic unit in the order of priority.

Next, definite signal names of the bus occupation request line 305 and bus permission line 304 and their meaning will be explained with reference to Table 1.

TABLE 1

| No. | signal name | transfer direction | structure |
| --- | --- | --- | --- |
| 1 | BUSREQ | CCONT → BC | individual |
| 2 | BUSACK | BC → CCONT | " |
| 3 | CPYBKREQ | MONITOR → BC | bus |
| 4 | CPYBKACK | BC → MONITOR | " |
| 5 | BUSBSY | main memory → BC | bus |

The bus occupation request line 305 includes a BUSREQ signal and CPYBKREQ signal.

(1) BUSREQ signal:

This is a bus occupation request from the cache controller or from the main memory controller, and is connected as an individual signal line to the bus controller. The condition of generation of this signal includes the case where a block transfer request is made in the arithmetic unit with miss of the cache memory, the case where a copy-back request is made when miss of the cache memory occurs and moreover, when the block to be replaced is under the Owned state and the case where data updating report (hereinafter called "broadcast"), which is necessary when writing is effected to the block under the Shared state. In the main memory controller, this signal is generated when the requested block is transferred to the requesting processor.

(2) CPYBKREQ signal:

This is a bus occupation request from the common bus monitor of each arithmetic unit and is connected to the bus controller by the bus structure. This signal is generated when the bus monitor detects a block transfer request on the common bus in the arithmetic unit, inspects inside its own cache memory and finds such a block and when the status of this block is Owned. This signal has higher priority than the BUSREQ signal. When the use of the bus is permitted, the block is copied back to the main memory.

Next, the bus use permission signal includes BUSACK, CPYBKACK and BUSBSY.

(3) BUSACK:

This is a bus use permission signal for the cache controller of each arithmetic unit and for the main memory controller from the bus controller, and is connected individually to each unit. This signal is generated for the unit having the highest priority when the common bus is not used and when the BUSREQ request is generated.

(4) CPYBKACK:

This is a bus use permission signal for the bus monitor of each arithmetic unit from the bus controller, and is connected to each monitor by the bus structure. This signal is generated when the common bus is not used and the CPYBKREQ request is generated.

(5) BUSBSY:

This signal represents the bus use by the cache controller and bus monitor of each arithmetic unit and by way of the main memory controller, and is connected to the bus controller by the bus structure. This signal is generated when each unit uses the common bus. Furthermore, the signal is generated when the buffer for accepting the block transfer request or the copy-back request is full in the main memory controller. While this signal is generated, the bus use permission signal, such as the BUSACK signal and the CPYBKACK signal, is not generated.

Next, the definite signal names of signals on the handshake controller bus and their meaning will be explained with reference to Table 2.

TABLE 2

| No. | signal name | transfer direction | structure |
| --- | --- | --- | --- |
| 1 | BCKREQ | CCONT → main memory MONITOR | bus |
| 2 | READ | CCONT → main memory MONITOR | " |
| 3 | BCKACK | main memory MONITOR → CCONT | " |
| 4 | BCKHIT | MONITOR → CCONT | " |
| 5 | BCKABOT | MONITOR → CCONT | " |
| 6 | BCAST | CCONT → MONITOR | " |
| 7 | BCASTACK | MONITOR → CCONT | " |
| 8 | MSACK | main memory → CCONT | " |
| 9 | MSACPT | CCONT → main memory | " |
| 10 | DSTROB | CCONT → main memory | " |
| 11 | DTACPT | main memory → CCONT | " |

(1) BCKREQ signal, READ signal:

These signals are the block transfer request or the copy-back request from the cache controller of each arithmetic unit to the main memory controller and are applied to the bus monitor of the main memory controller and to that of each arithmetic unit. The READ signal is generated simultaneously at the time of the block transfer request. First of all, the BCKREQ signal and the READ signal are generated simultaneously at the time of the block transfer resulting from the cache miss. The condition under which the BCKREQ signal is generated but the READ signal is not generated is that the status of the block to be replaced is Owned at the time of cache miss, and this is effected for making a copy-back. When both the BCKREQ signal and the READ signal are generated, each bus monitor detects them and must inspect the content of its own cache memory using the address on the common bus.

(2) BCKACK signal:

This is a block transfer request acceptance response from the bus monitor of each arithmetic unit and from the main memory controller and is applied to each cache controller using the bus structure. This signal is generated when the block transfer is accepted in the main memory controller, and when the block transfer on the common bus is detected in the bus monitor and a search of the content of its own cache memory is completed.

(3) BCKHIT signal:

This is a cache hit report from the bus monitor of each arithmetic unit and is applied to each cache memory by the bus structure. The condition under which this signal is generated is that the bus monitor detects the block transfer request on the common bus and accesses its own cache memory and the block is found existing as a result of retrieval. This signal is generated simultaneously with BCK- ACK. On receiving this signal, the cache controller must write the transferred block under the Shared status into its own cache memory.

(4) BCKABOT signal:

This is a block transfer abort request from the bus monitor from each arithmetic unit and is applied to each cache memory using the bus structure. The condition under which this signal is generated is that the bus monitor detects a block transfer request on the common bus and accesses its own cache memory and that the block is found existing as a result of access and moreover, the status of this block is Owned. On receiving this signal, the cache controller must retry the block transfer request under execution.

(5) BCAST signal:

This is a data updating report from the cache controller of each arithmetic unit and is applied to each monitor via the bus structure. This signal is generated when the write access from the arithmetic unit hits the cache memory and the status of the corresponding block is Shared. Upon detection of this signal, each bus monitor inspects the content of its own cache memory and must nullify the block if it exists.

(6) BCASTACK signal:

This is a broadcast request acceptance response from the bus monitor of each arithmetic unit and is applied to each cache memory via the bus structure. This signal is generated unconditionally when the bus monitor accepts the broadcast request.

(7) MSACK signal:

This is a data transfer end report from the main memory controller and is applied to each cache controller via the bus structure.

(8) MSACPT signal:

This is a data transfer acceptance response from each cache controller to the memory control system and is applied to the main memory controller via the bus structure.

(9) DSTROB signal:

This is a signal reporting that the data transfer is complete when copy-back is made from each cache controller or from each bus monitor. It is applied to the main memory controller via the bus structure.

(10) DTACPT signal:

This is a copy-back data acceptance request from the main memory controller to each cache controller and to the bus monitor and is applied to each unit via the bus structure.

Next, the bus operation on the common bus and the timing flow will be described with reference to FIGS. 5 to 9.

FIG. 5 shows the bus operation for broadcast. This operation is started when writing to the data cache occurs in each arithmetic unit, which is cache hit, and moreover, the corresponding block is Shared. First of all, the cache controller generates the bus occupation request (BUSREQ1) to the bus controller. The bus controller identifies from the BUSBSY signal that the bus is not used, and gives the bus use permission by the BUSACK1 signal. In the example of this bus operation, the bus occupation request (BUSREQ2) is generated simultaneously from another arithmetic unit, but permission is given to BUSREQ1 by the priority judgement of the bus controller. Since BUSBSY is generated during the operation of BUSREQ1, BUSREQ2 cannot receive the bus use permission until this bus operation is complete.

Accepting the bus use permission, the bus controller puts the broadcast address onto the common bus and generates the BCAST signal. It also generates the BUSBSY signal at the same time. The bus monitors of the arithmetic units, including the bus monitor of the unit which initiates the broadcasting, detect the BCAST signal, take the address on the common bus into their own units and generate BCASTACK. The cache controller that generates the broadcast request confirms that BCASTACKs of all the bus monitors are generated and negates the BCAST signal and the BUSBSY signal. Each bus monitor detects negation of the BCAST signal and makes a search and nullification of its own cache memory. The bus controller confirms negation of the BUSBSY signal and gives permission to the bus occupation request of BUSREQ2.

Figure 6:
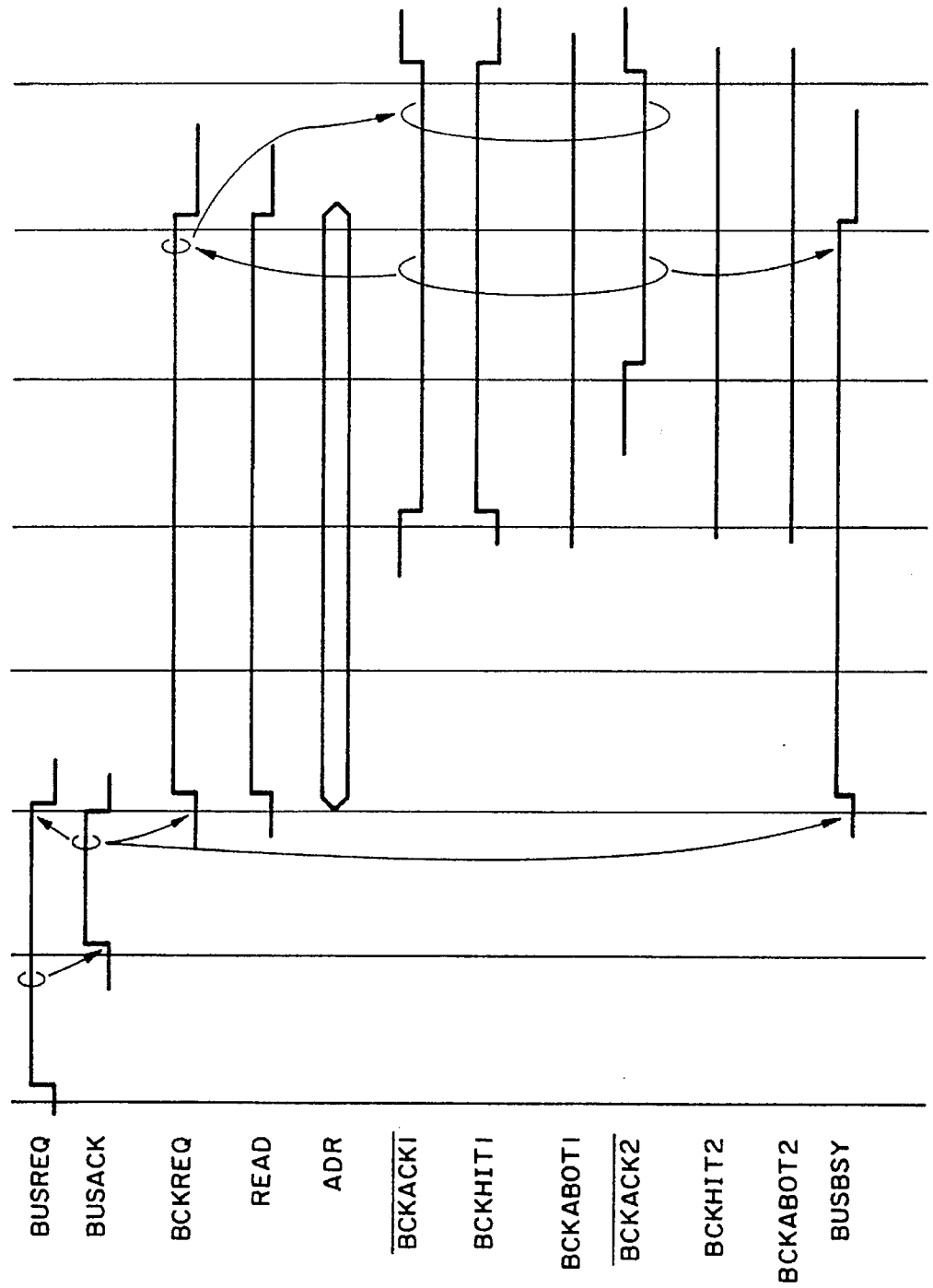
FIG. 6 is a time chart showing the bus operation, of block transfer evocation.

FIG. 6 shows the bus operation of the block transfer request and particularly the case where the requested block is shared by the cache memory of another arithmetic unit. When access to the cache memory is generated in a certain arithmetic unit and this causes a miss, this bus operation is started. First of all, the cache controller generates the bus occupation request (BUSREQ) to the bus controller and accepts the bus use permission (BUSACK signal). Next, the address causing cache miss is put on the common bus and the block transfer request is generated for the main memory controller (BACKREQ, READ). Upon receiving this request, the main memory controller generates unconditionally the block transfer request acceptance response (BCKACK). Upon detecting the block transfer request on the common bus, each bus monitor takes the address into its own unit and accesses the cache memory. If the corresponding block is found and the status of the block is Shared or Exclusive, the BCKHIT signal is asserted with the BCKACK signal. If the status of the block is Owned, the BCKABOT signal is asserted, too. Though this bus operation represents two sets of response signals, both of them represent the case where the BCKABOT signal is not asserted. After confirming that all BCKACKs are asserted, the cache controller negates BCKREQ and BUSBSY. When BCKHIT is asserted in this case, the block data, when it is transferred, is written into the cache memory under the Shared status. After confirming that BCKREQ is negated, each bus monitor changes the hit block to the Shared status.

Figure 7:
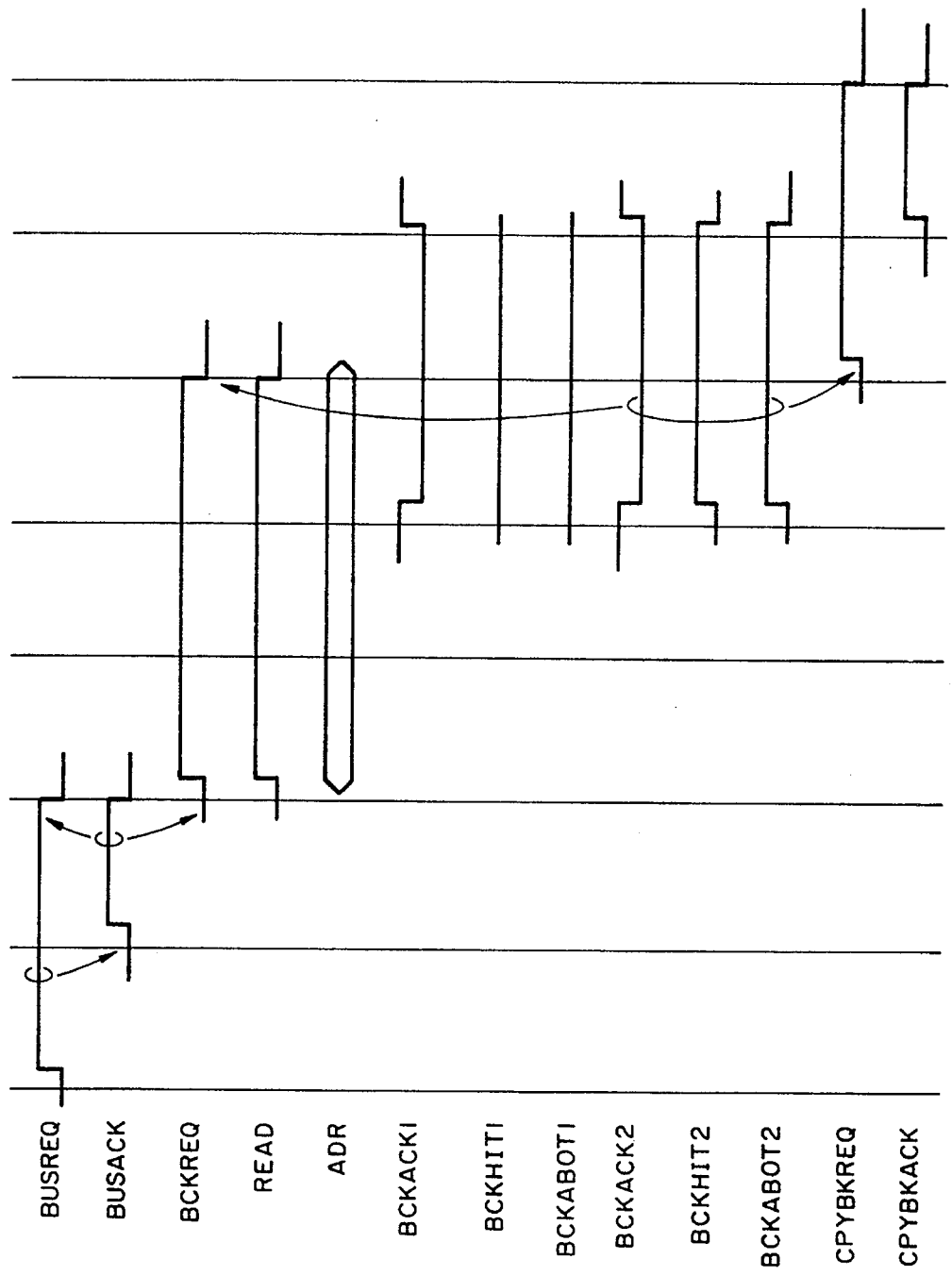
FIG. 7 is a time chart showing the bus operation for aborting block transfer evocation.

FIG. 7 shows the bus operation of the block transfer request and particularly the case where the requested block is under the Owned state in the cache memory of another arithmetic unit. After occupying the bus requested for the bus controller, the cache controller puts the address causing the cache miss on the common bus and generates the block transfer request (BCKREQ, READ) to the main memory controller. The main memory controller generates unconditionally BCKACK. Alternatively, each bus monitor takes the address on the common bus and accesses its own cache memory.

Though only two sets of response signals are shown in this example, the block under the Owned state is detected (BCKABOT2) in the arithmetic unit No. 2. After confirming that all BACKACKs are asserted, the cache controller negates BCKREQ and BUBSY. If BCKABOT is asserted at this time, it retries the block start request that is made at present from the bus occupation cycle. On the other hand, the bus monitor that detects the block under the Owned state asserts the BUSBSY signal and makes the common bus unusable.

Thereafter, negation of BCKREQ is confirmed, the copy-back request (CPYBKREQ) of the Owned block is generated and BUSBSY is negated. Since the copy-back operation by the bus monitor has the highest priority, the copy-back operation of the Owned block can be executed in succession to the aborted block transfer operation. This is means for solving the deadlock. Upon detecting the BCKABOT signal, the main memory controller nullifies the block transfer request that is accepted at present.

Figure 8:
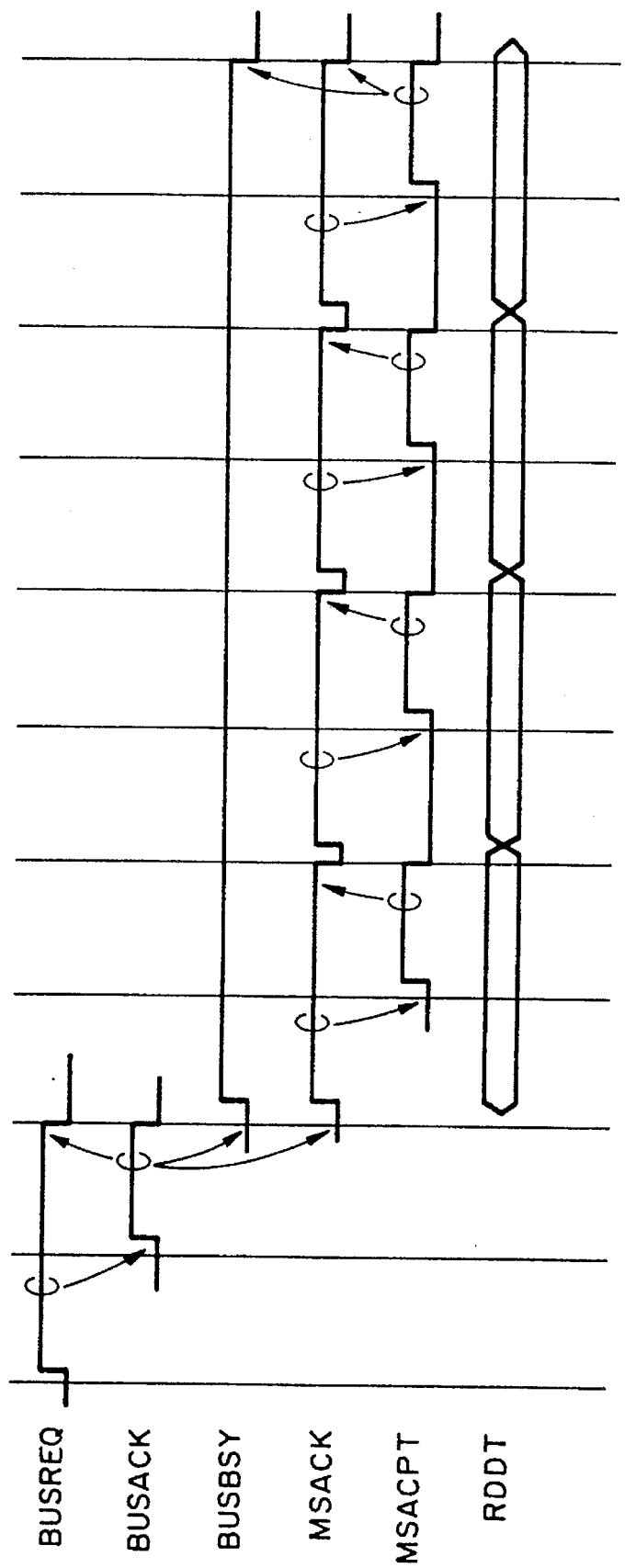
FIG. 8 is a time chart showing the bus operation of block transfer.

FIG. 8 shows the block transfer operation from the main memory to the cache memory. The drawing shows the case where 8 bytes are transferred in one data transfer with the block size being 32 bytes. When block transfer is ready, the main controller generates the occupation request of the common bus to the bus controller, and asserts the BUSBSY signal upon receiving the bus use permission, puts the block data onto the common data bus and generates the data transfer end report (MSACK) to the cache controller. Receiving this data, the cache controller generates the data acceptance response (MSACPT). When the data transfer is carried out similarly four times, this bus operation is completed.

Figure 9:
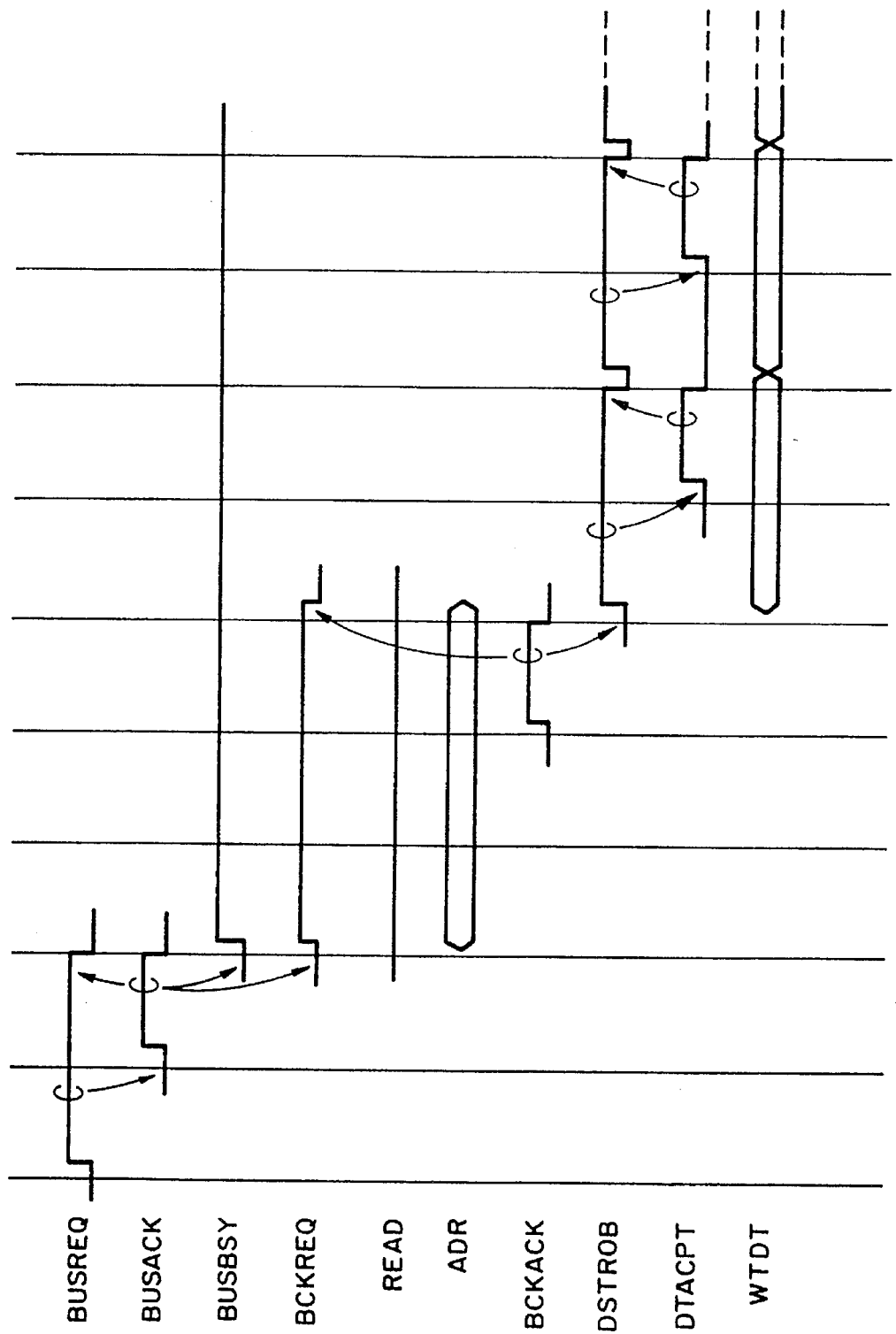
FIG. 9 is a time chart showing the bus operation of copy-back.
Figure 10:
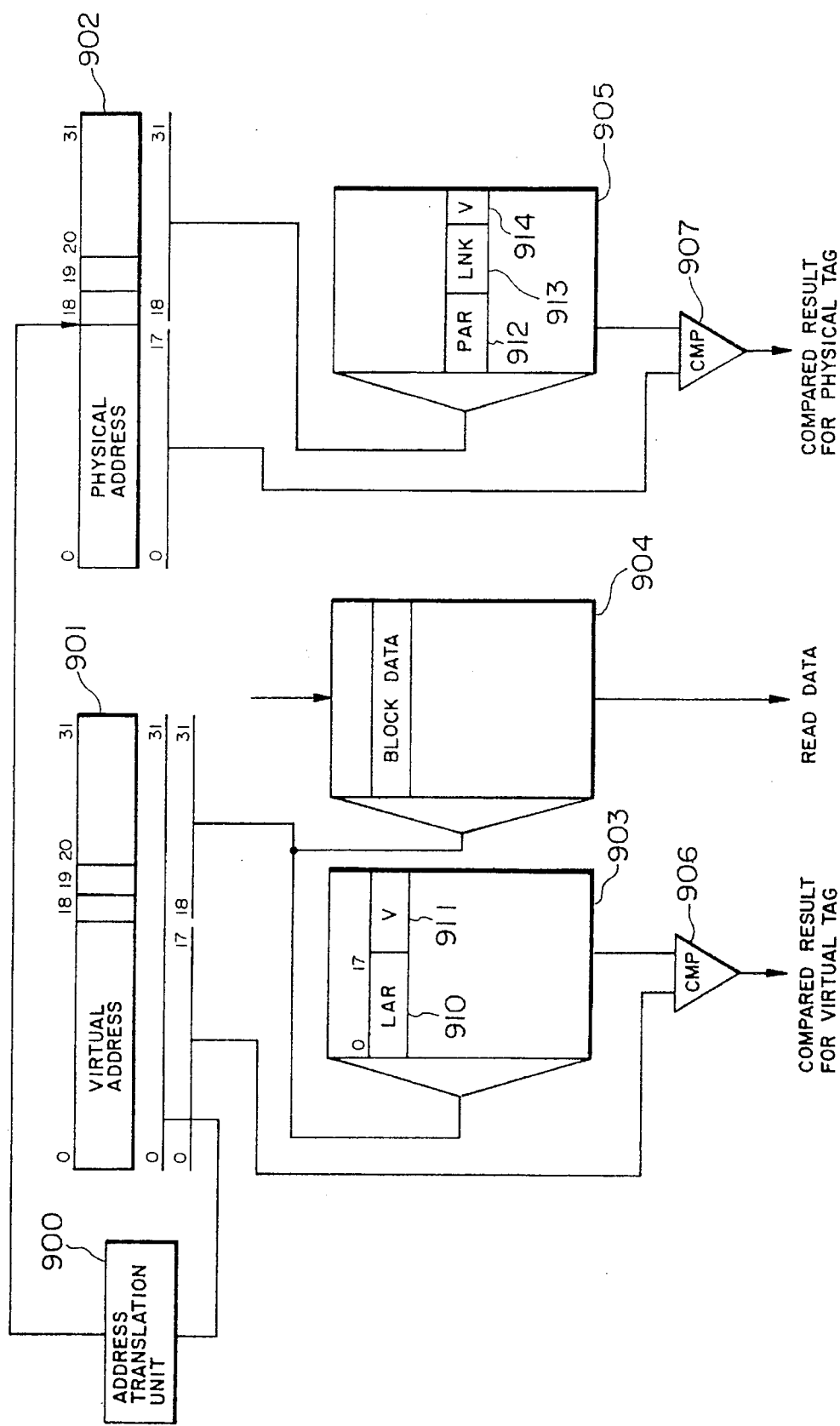
FIG. 10 is a structural view of a cache memory employing a link bit system.

FIG. 9 shows the copy-back operation from the cache controller or from the bus monitor. After the common bus is occupied, the copy-back request is generated to the main memory controller (BCKREQ, READ). When the copy-back acceptance report is made from the main memory controller, the data to be copied back is put onto the common bus and the data transfer report (BSTROB signal) is generated. When the data acceptance response (BTACPT signal) is generated from the main memory controller, the next data is put onto the bus and the operation is started.

After the data transfer is performed four times, this bus operation is completed.

Figure 1:
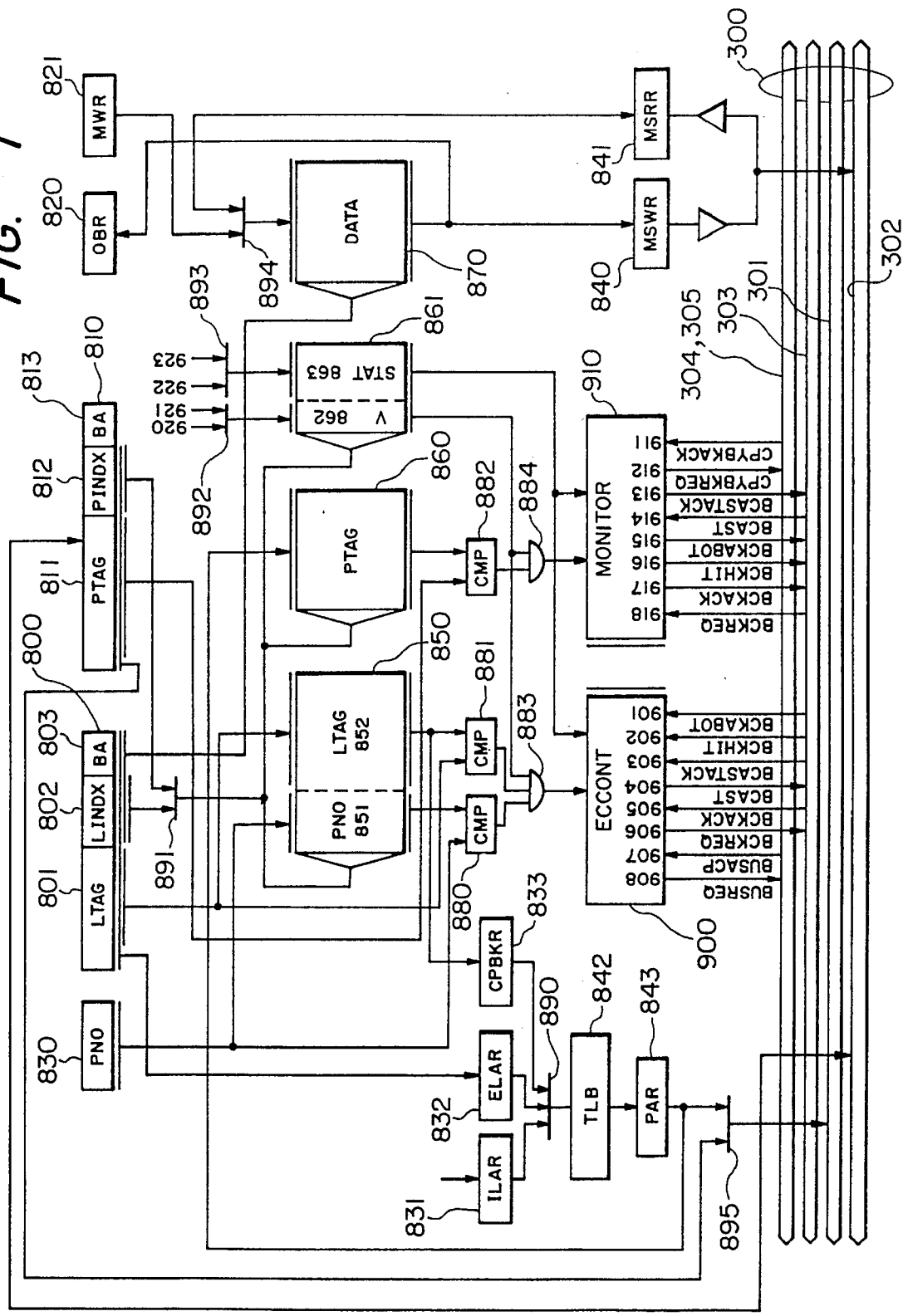
FIG. 1 shows the first embodiment of the present invention.

Next, one embodiment of the logical cache memory of this invention will be explained with reference to FIG. 1. This embodiment represents the data cache, which consists of a logical address tag portion 850 as a comparison tag for indexing the cache, a physical tag portion 860 for holding the physical address tag corresponding to the logical address, a status portion 861 for representing the status of each block and a data portion 870. The logical address tag portion 850 consists in turn of a process identifier portion (PNO) 851 and a logical tag (LTAG) portion 852 for holding the upper order portion of the logical address. The status portion 861 consists of a V bit 862 representing whether the corresponding block is effective or invalid, and a STAT portion 863 representing the status of the corresponding block. The STAT portion is 2-bit wide and divides the status of the block into three states, i.e., Shared, Exclusive and Owned. A data cache controller (ECCONT) 900 and a common bus monitor (MONITOR) 910 are used as main controllers. Though not shown in the drawing, an address conversion buffer (TLB) 842 and an address conversion controller (MCONT) for controlling the access to the address conversion table are also provided. The cache memory employing this structure is characterized in that the address inside the page, which does not depend on address conversion, is used as the index to the cache memory and since a logical address tag and a physical address tag are employed, the cache can be indexed by either the logical address or the physical address.

First of all, the processing for the access from the instruction execution unit will be explained with reference to FIG. 1.

(1) Read hit:

When the read access is made from the instruction execution unit, the process identifier is set to the register 830 and the logical address is set to the register 800. Among the logical addresses 800, the output of the logical index portion 802 (LINDX) which does not depend on address conversion is selected by a selector 891 so that access is made to the logical address tag portion 850 and to the status portion 861. On the other hand, access is made to the data portion 870 by the logical index portion 802 and by the address portion (BA) 803 inside the block. Among the outputs of the logical address tag portion 850 read out by this access, the process identifier 851 is compared with the content of the register 830 by a comparator 880 to examine coincidence. On the other hand, the logical tag portion 852 thus read out is compared with the logical tag portion 801 of the register 800 by another comparator 881 to examine coincidence. The outputs of these two comparators and the output of the effective bits 862 inside the status portion 861 are inputted to an AND gate 883 to clarify whether or not the requested data exists inside the cache memory. This coincidence information is inputted into a data cache controller 900 and if it is coincident, the output of the data portion 870 is set to an operand buffer register (OB2) 820.

(2) Read mistake:

The coincidence examination of the cache memory is made in the same way as described above. If miss is found as a result of coincidence examination, the content of the register 800 is set to the data logical address register (ELAR) 832. At this time, the content of the block status (STAT) 863 inside the status portion 861 is simultaneously inputted to the cache controller 900 to check the status of the block to be replaced. If the status is found as Owned as a result of this check, the logical address of the replace block is set to the copy-back address register (CPBKR) 833 for the purpose of copy-back.

The case where the replace processing is not necessary will be explained. The data cache controller 900 requests the address change of the requested block to an address conversion controller (not shown). The address conversion controller selects a register 832 by a selector 890, converts the logical address to a physical address by a TLB 842 and sets it to a physical address register (PAR) 834. Then, it reports the end of address conversion to the cache controller 900. The cache controller 900 asserts the bus occupation request (BUSREQ) 908 and after occupying the bus, generates the block transfer request (BCKREQ) 906. When the abort request (BCKABOT) 901 representing that the corresponding block inside other cache memories is Owned is asserted for this request, the cache controller occupies the bus and tries once again at the same block address. When no abort request exists and BCKHIT representing that the corresponding data is shared by the cache memory(ies) is asserted, it stores this and sets the status of this block to Shared by use of a line 922 and a selector 893 after the end of block transfer.

When BCKHIT is not asserted, the status of the data is set to Exclusive after the end of block transfer. When this block data is transferred, it is first accepted in the main memory read register 841, then selected by the selector 894 and thereafter written into the data portion 870. At this time, the corresponding physical address is inputted into the physical address tag portion 860 from the register 833 and written after the end of block transfer.

Next, when copy-back of the replace block is necessary before the transfer of the block containing the requested data, the change request of the copy-back address is generated from the cache controller 900 to the address conversion controller, which then selects the copy-back register 833 by the selector 890, converts it to the physical address by TLB 842, sets it to the register 843 and reports the end of address conversion to the cache controller 900. After occupying the common bus, the cache controller 900 generates the copy-back request to the main memory controller, too. When this request is accepted, the replace block inside the data portion is transferred to the main memory controller through the main memory write register 840 while the address 803 inside the block of the register 800 is changed. After the copy-back processing is completed, the block transfer of the requested data is made using the same procedure as described already.

(3) Write hit:

At the time of write access, the process identifier is set to the register 830 while the logical address and the write data are set to the register 800 and to the register 821, respectively. Then, the coincidence examination of the cache memory is carried out using the contents of the registers 830 and 800. At this time, STAT 863 representing the status of the corresponding block is inputted to the cache controller 900. As a result, if a cache hit exists and the status of the block is either Owned or Exclusive, the content of the register 821 is selected by the selector 894 and written into the data portion 870. If the status of the block is Shared, it is written into the data portion 870 and the content of the register 800 is set to the register 832. At the same time, the address conversion request is generated. After address conversion is completed, the content of the register 843 is put onto the common bus and the nullification request of other cache memories is generated by broadcast.

(4) Write miss:

The block transfer procedure due to the cache miss is the same as that of read miss. The write sequence after the block transfer is the same as that of write miss.

Next, the monitor operation of the common bus will be explained with reference to FIG. 1.

(1) When broadcast is detected:

When the bus monitor 910 detects the broadcast request by the signal 914 from the common bus, it takes in the physical address from the address bus 301, sets it into the register 810 and sends back the response by the signal 915. The register 810 consists of the physical index portion 812 not depending on the address conversion, the physical address tag 811 and the inside-block address 813. The physical index 812 of the register 810 is selected by the selector 891 so as to make access to the physical address tag portion 860 and to the status portion 861.

The output of the physical address tag portion 860 is compared with the content of the physical tag 811 of the register 810 by the comparator 882 and its output is inputted to an AND gate 884 together with the output of the effective bit 862 of the status portion 861, thereby clarifying whether or not the monitored physical data exists inside the cache memory. This coincidence information is inputted to the bus monitor 910 and if coincidence is established, the effective bit of the block is cleared by a line 921 and a selector 892.

(2) When block transfer evocation is detected:

When detecting the block transfer evocation from the common bus through the signal line 918, the bus monitor 910 takes in the physical address from the address bus 301 and sets it into the register 810. Next, coincidence of the cache memory is checked by the physical address of the register 810 and the status information 863 of the block is taken into the cache controller 900. If a cache hit exists and the status of the block is either Shared or Exclusive, the hit is reported to the memory causing the block transfer evocation through the signal line 916. Thereafter, the status of the block is changed to the Shared state by the signal line 923 and the selector 893. If the status of the block is Owned, the block transfer evocation under execution is aborted by the signal line 915. Then, the common bus is occupied by the signal lines 911 and 912, the physical address of the register 810 is selected by the selector 895 and put onto the address bus 301 and copy-back evocation is made. If this evocation is accepted by the main memory controller, the inside-block address 813 of the register 810 is updated so that the copy-back block is put on the common data bus 302 through the register 840 to execute copy-back processing. Thereafter the status of the block is changed to Exclusive. If the block does not exist, BCKACK 917 is asserted and a response is sent back to the memory causing the block evocation.

Next, a second embodiment of the present invention will be described in detail with reference to FIG. 11. The structure of the data processor to which the present invention is applied is shown in FIG. 2 and the structure of its common bus 300 is shown in FIG. 3. FIGS. 5 to 9 show the bus operation on the common bus and its timing flow. Since the detail of each drawing has been explained for the first embodiment and is the same as that of the first embodiment, such detailed description will not be repeated.

Figure 11:
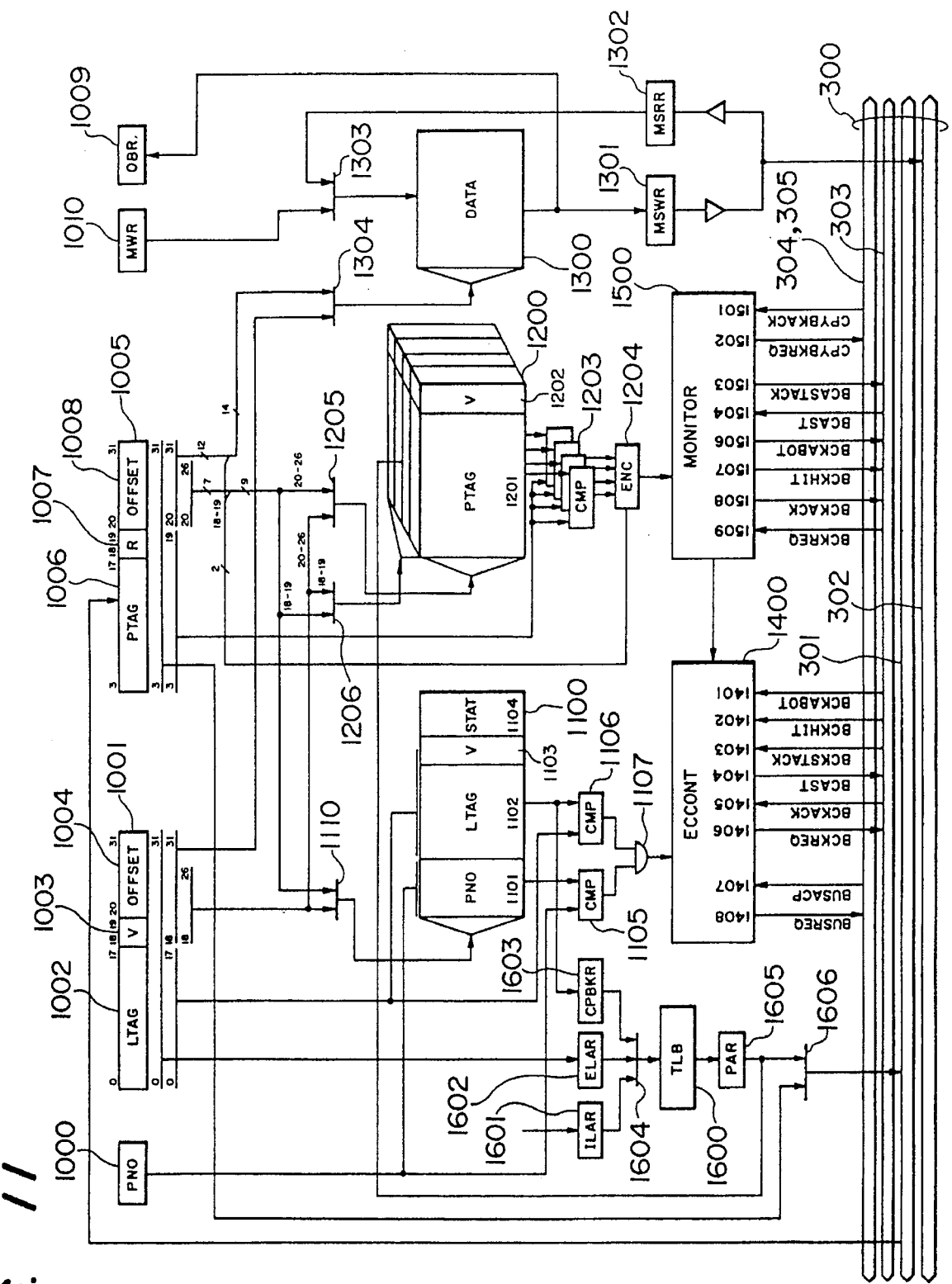
FIG. 11 shows the second embodiment of the present invention.

FIG. 11 shows the structure of the logical cache memory. The logical cache memory consists of a data portion 1300 for holding temporarily the data of the main memory, a logical directory portion 1100 for holding the logical address information corresponding to the data described above and a physical directory portion 1200 corresponding to the data. The logical directory portion 1200 consists of a process identifier (PNo) 1101, a logical tag portion (LTAG) 1102 for holding the bits 0–17 of the logical address, V bit 1103 representing whether the corresponding block is effective or ineffective and a STAT portion 1104 representing the status of the corresponding block. The STAT portion is 2-bit wide and divides the status of the block into three states, i.e. Shared, Exclusive and Owned. On the other hand, the physical directory portion 1200 consists of a physical tag portion (PTAG) 1201 for holding the bits 3–19 of the physical address and V bit 1202 representing the effectiveness of the corresponding block. The physical directory portion 1200 consists of four sets and is accessed in parallel by an address of 5 bits that are selected by the selector 1205. The sets are selected by an address of 2 bits that are selected by the selector 1206. Main control systems include a data cache controller (ECCONT) 1400 for controlling the block transfer to the cache memory and a common bus monitor (MONITOR) 1500 for detecting the transaction on the common bus and controlling nullification of the cache, or the like.

A logical address register 1001 stores a logical address of data to be accessed. The logical address register 1001 is composed of a most significant bit portion 1002 (LTAG) and an intermediate bit portion 1003 (V) and a least significant bit portion 1004 (OFFSET). The most significant bit portion 1002 (LTAG) and the intermediate bit portion 1003 (V) are affected by address conversion. On the other hand, the least significant bit portion 1004 (OFFSET) is not affected by address conversion. A physical address register 1005 stores a physical address of data to be accessed. The physical address register 1005 is composed of a most significant bit portion 1006 (PTAG) and an intermediate bit portion 1007 (R) and a least significant bit portion 1008 (OFFSET). The most significant bit portion 1006 (PTAG) and the intermediate bit portion 1007 (R) are affected by address conversion. On the other hand, the least significant bit portion 1008 (OFFSET) is not affected by address conversion.

Next, the access sequence of each directory is shown. When access is made to the logical directory portion 1100 by the logical address 1001, the bits 18–26 of the logical address 1001 are selected by the selector 1110. Among them, the bits 20–26 are the portions which are not the object of address conversion and the bits 18–19 are the portion which changes depending on the address conversion. On the other hand, when access is made to the physical directory portion 1200 by the logical address, the bits 20–26 of the logical address 1001 which do not depend on the address conversion are selected by the selector 1205 and become inside-set index address. The bits 18–19 which depend on the address conversion are selected by the selector 1206 and used for 4-bit selection.

Next, the case where access is made to the physical directory 1200 by the physical address 1005 will be described. Among the physical address 1005, the bits 20–26 which do not depend on the address conversion are selected by the selector 1205 and become inside-set index address. The physical tag portion 1201 read out from each set of the physical directory portion 1200 is compared with the bits 3–19 of the physical address 1005 by the comparator 1203 disposed for each set so as to detect the existence of the data. When the logical directory portion 1100 is accessed by the physical address 1005, access is first made to the physical directory portion 1200 in accordance with the procedure described above and if the corresponding data exists, the output of the comparator 1203 is encoded to the 2-bit information by an encoder 1204. This code information is merged with the bits 20–26 of the physical address 1005, selected by the selector 1110 and then becomes the index address of the logical directory portion 1100. When access is made to the cache data portion 1300 using the logical address 1001, the bits 18–31 of the logical address 1001 are selected by the selector 1304 and used as the index address. Furthermore, when access is made to the cache data portion 1300 using the physical address 1005, access is first made to the physical directory portion 1200 and if the existence of the logical block is detected by the comparator 1203, the output of the encoder 1204 is merged with the bits 20–31 of the physical address 1005, selected by the selector 1304 and becomes the index address.

Registration to the logical directory portion 1100, the physical directory portion 1200 and the cache data portion 1300 is made only when the cache memory causes a miss. At this time, the bits 18–31 of the logical address 1001 are selected by the selectors 1110 and 1304 as the index address of the logical directory portion 1100 and as that of the cache data portion 1300, respectively. The bits 20–26 of the logical address 1001 are selected by the selector 1205 as the index address of the physical directory portion 1200 and used as the inside-set index address. The bits 18–19 of the logical address 1001 are selected by the selector 1206 and used as the set selection address.

Figure 12:
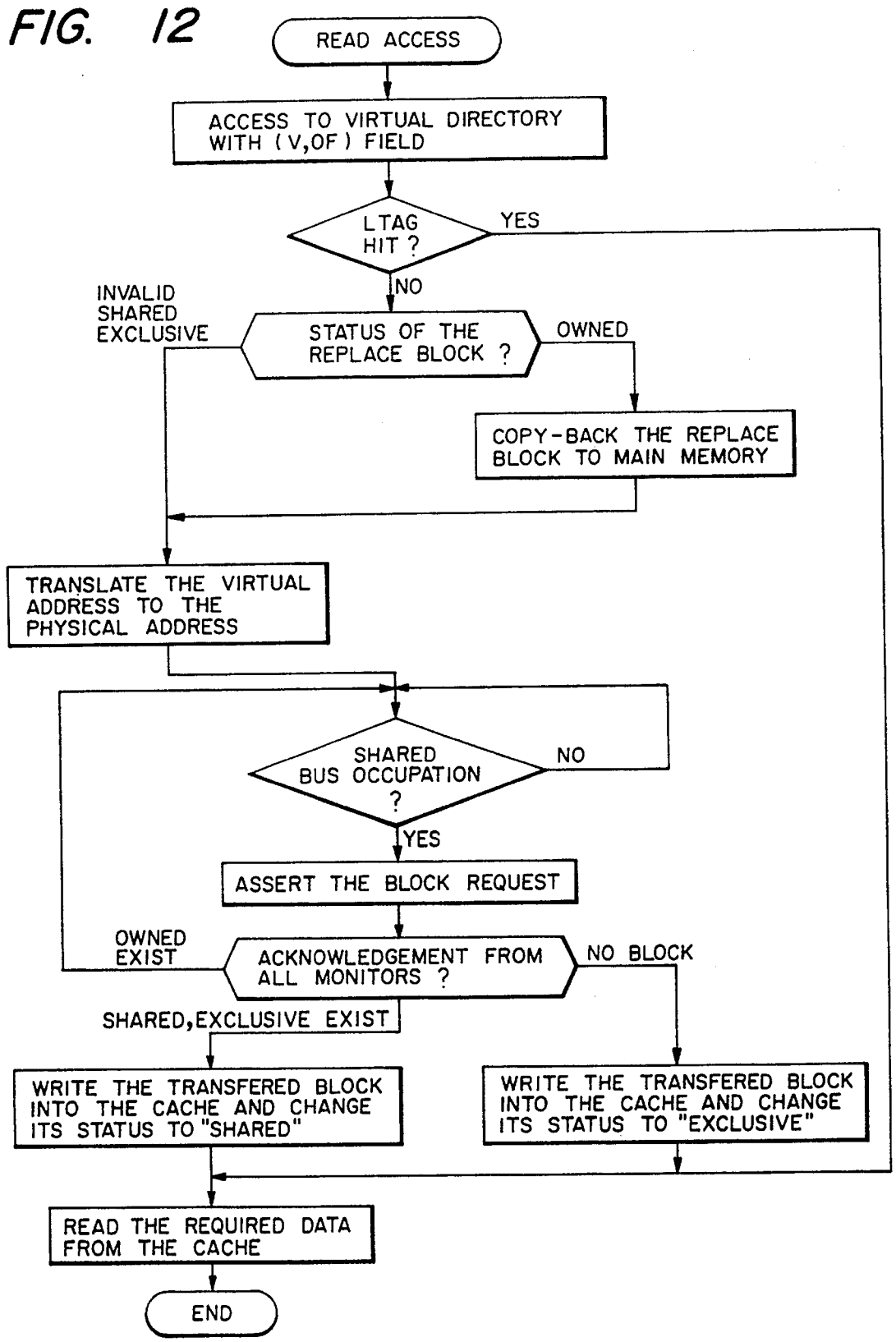
FIG. 12 is a flow chart showing processing at the time of read access.
Figure 13:
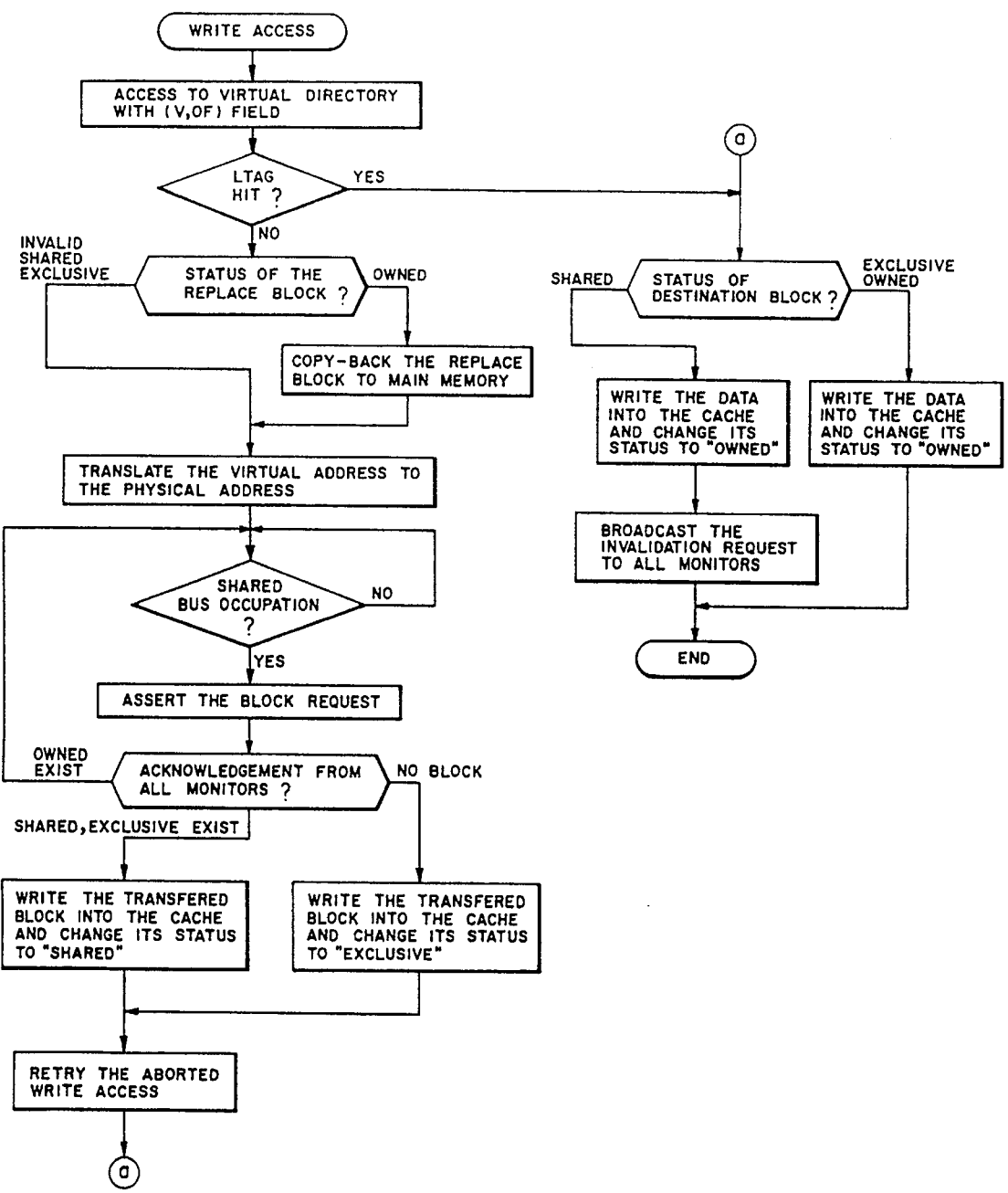
FIG. 13 is a flowchart showing the processing at the time of write access.

Next, the access processing by the logical address from the instruction execution unit will be described in detail with reference to FIG. 11, FIG. 12 which shows the processing flow at the time of read access and FIG. 13 which shows the processing flow at the time of write access.

(1) Read hit:

When read access from the instruction execution unit exists, the process identifier is set into the register 1000 while the logical address is set into the register 1001. Next, among the logical address 1001, the index address (bits 18–26) containing the bits 18–19 which depend on the address conversion is selected by the selector 1110 and access is made to it. On the other hand, in the cache data portion, the bits 18–31 of the logical address 1001 are selected and accessed by the selector 1304. Among the information read out from the logical directory, the process identifier 1101 is compared with the content of the register 1000 by the comparator 1105. The logical tag 1102 is compared with the bits 0–17 of the logical address register 1001 in the comparator 1106. The outputs of these two comparators and the output of the effective bit 1103 of the logical directory are inputted to the AND gate 1107 and whether or not the requested data exists inside the cache memory is determined. This coincidence information is inputted to the data cache controller 1400 and if coincidence is found, the output of the cache data portion 1300 is set in the operand buffer register (OBR) 1009 and sent to the instruction execution unit.

(2) Read mistake:

The coincidence check operation of the cache memory is the same as described above. If miss is found as a result of the coincidence check, the content of the register 1001 is set to the data logical address register (ELAR) 1602. At the same time, the content of the block status 1104 inside the logical directory 1100 is inputted to the cache controller 1400 and the status of the block to be replaced is checked. As a result, if the status is Owned, the logical address of the replace block is set to the copy-back address register (CPBKR) 1603 for copy-back.

Now, the case where the replacing processing is not necessary will be described. The data cache controller 1400 requires the address conversion controller (not shown) to make address conversion of the requested block. The address conversion controller selects the register 1602 by the selector 1604, converts the logical address to the physical address by the address conversion buffer (TLB) 1600 and sets it in the physical address register (PAR) 1605. Then, it reports the end of address conversion to the cache controller 1400.

The cache controller 1400 asserts the bus occupation request (BUSREQ) 1408, occupies the bus and then generates the block transfer request (BCKREQ) 1406. When the abort request (BCKABOT) 1401 representing that the corresponding block is Owned in other cache memories is asserted to this request, the cache controller tries once again at the same block address from the bus occupation. When there is no abort request and BCKHIT 1402 representing that the corresponding block is shared in other cache memories is asserted, the controller stores this and sets the status of this block to Shared after the end of block transfer. When BCKHIT is not asserted, the status of the corresponding data is set to Exclusive after the block transfer.

When the block data is transferred, it is first taken into the main memory read register 1302, then selected by the selector 1303 and written into the data portion 1300. As the index address at this time, the bits 18–31 of the logical address register 1001 are selected by the selector 1304. After the block transfer is completed, the process identifier and the bits 0–17 of the logical address register 1001 are registered into the regions 1101 and 1102 of the logical directory, respectively. As the index address at this time, the bits 18–26 of the register 1001 are selected by the selector 1110. Furthermore, the bits 3–19 of the physical address register 1605 are registered to the physical directory 1200. As the index address at this time, the bits 20–26 of the register 1001 are selected by the selector 1205 and become the inside-set index address, and the bits 18–19 of the register 1001 are further selected by the selector 1206 and become the set selection address.

Next, when copy-back of the replace block is necessary before the transfer of the block containing the requested data, the cache controller 1400 generates the address conversion request to the address conversion controller. The address conversion controller selects the copy-back address register 1603 by the selector 1604, converts it to the physical address using the TLB 1600, sets it in the register 1605 and reports the end of address conversion to the cache controller. The cache controller 1400 occupies the common bus and generates the copy-back request to the main memory controller. When this request is accepted, the replace block of the data portion 1300 is transferred to the main memory controller through the main memory write register 1301 while the inside-block address (bits 27–29) of the register 1001 is being updated. When the copy-back processing is complete, the block transfer of the requested data is made in the same procedure as described above.

(3) Write hit:

At the time of write access, the process identifier is set in the register 1000 and the logical address and the write data are set to the registers 1001 and 1010, respectively. Next, access is made to the logical directory 1100 using the contents of the registers 1000 and 1001 to check coincidence. At this time, STAT 1104 representing the status of the block is inputted to the cache controller 1400. As a result, if the cache hit exists and the status of the block is either Owned or Exclusive, the bits 18–31 of the register 1001 are written into the data portion 1300 as the index address by selecting the content of the register 1010 using the selector 1303. If the status of the block is Shared, on the other hand, the bits are written into the data portion 1300, the block status is changed to Owned, the content of the register 1001 is set in the register 1602 and the address conversion request is generated. When the address conversion is complete, the content of the physical address register 1605 is put onto the common bus 300 and the nullification request is generated by the broadcast (BCAST) 1404 to all the cache memories including its own cache memory.

(4) Write miss:

The block transfer procedure with the cache miss is the same as that of the read miss. The write procedure after the end of block transfer is the same as that of a write hit.

Next, the operation of the common bus monitor will be described with reference to FIG. 11.

Figure 14:
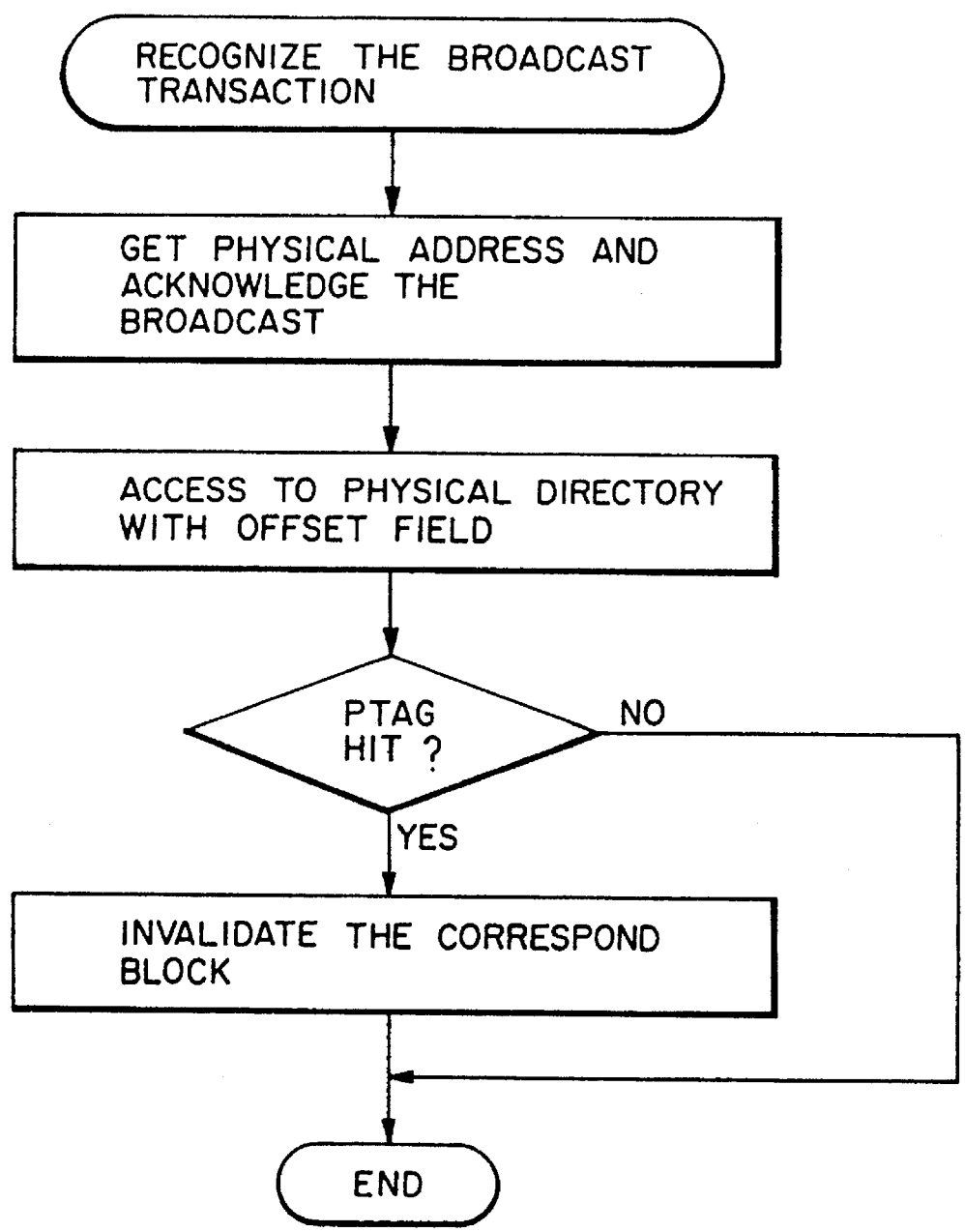
FIG. 14 is a flowchart showing the processing at the time of broadcast detection.

(1) At the time of detection of broadcast:

FIG. 14 shows the processing when the bus monitor 1500 detects the transaction of broadcast on the common bus 300. When detecting the broadcast request from the common bus 300 by the signal 1504, the bus monitor 1500 takes in the physical address from the address bus 301, sets it in the physical address register 1005 and sends back the response by the BCASTACK signal 1503. Next, in the physical address 1005, the bits 20–26 which do not depend on address conversion are selected by the selector 1205 and access is made simultaneously to all of the four sets of the physical directory 1200. The physical tag portion 1201 read out from each set is compared with the bits 3–19 of the register 1005 by the comparator 1203 disposed for each set. The output of the comparator 1203 is subjected to AND calculation with the effective bits of the physical directory 1200 and whether or not the data corresponding to the monitored physical address exists inside the cache memories is clarified. The result of the coincidence check is inputted to the bus monitor 1500 and when coincidence is detected, the interrupt request is generated from the bus monitor 1500 to the cache controller 1400. Thereafter, the output of the comparator 1203 is merged with the encoded information by the encoder 1204 and with the bits 20–26 of the physical address and becomes the index address of the logical directory 110 through the selector 1110, and the effective bits 1103 inside the logical directory 1100 are cleared. At the same time, the information encoded by the encoder 1204 is selected by the selector 1206 and is used as the set selection address of the physical directory 1200, and the effective bits 1202 in the physical directory 1200 are cleared.

Figure 15:
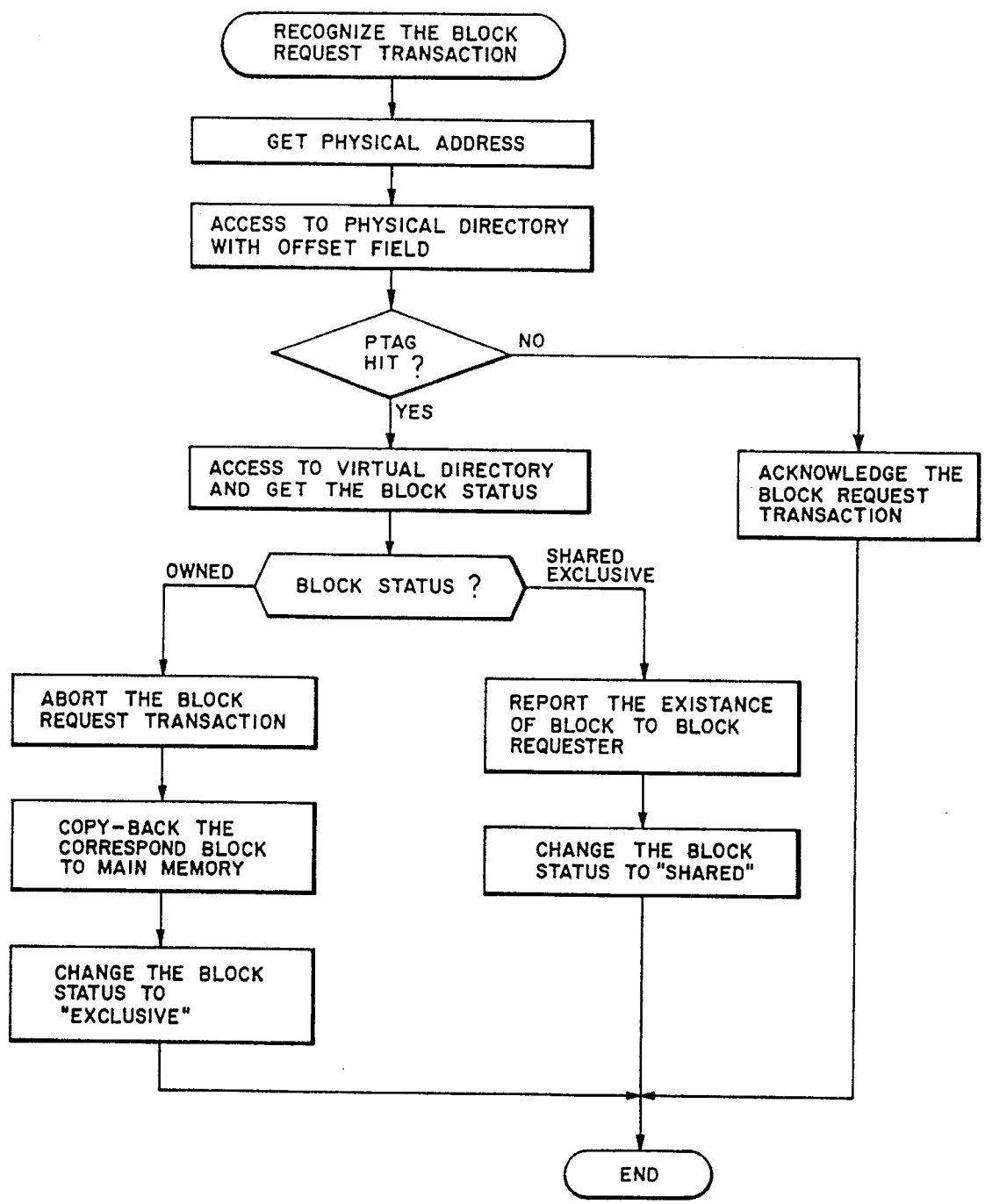
FIG. 15 is a flowchart showing the processing at the time of block transfer evocation detection.

(2) When block transfer start is detected:

FIG. 15 shows the processing when the bus monitor 1500 detects the transaction of the block transfer start on the common bus 300. Detecting the block transfer start from the common bus 300 by the BCKREQ signal 1509, the bus monitor 1500 takes in the physical address from the address bus 301, and sets it into the physical address register 1005. Next, in the same way as the process at the time of detection of the broadcast request, it makes access to the physical directory 1200 in order to check the coincidence of the block. The result of coincidence check is inputted to the bus monitor 1500 and if coincidence is detected, the interrupt request is generated from the bus monitor 1500 to the cache controller 1400. Then, the output of the encoder 1204 is merged with the bits 20–26 of the physical address 1005 and access is made to the logical directory 1100 through the selector 1110. Among the information stored in the logical directory 1100, the status information 1104 of the coincident block is read out and inputted to the bus monitor 1500. As a result, if the status of the block is either Shared or Exclusive, the BCKHIT signal 1507 and the BCKACK signal 1508 are asserted and the cache hit is reported to the memory causing the block transfer start. Thereafter, the status of the block is changed to the Shared status.

If the status of the block is Owned, the BCKABOT signal 1506 and the BCKACK signal 1508 are asserted so as to abort the block transfer start under execution. Thereafter, the common bus 300 is occupied by asserting CPYBKREQ 1502 and the physical address of the register 1005 is selected by the selector 1606 and put onto the address bus 301 and copy-back start is made. When this start is accepted by the main memory, the inside-block address (bits 27–29) of the register 1005 is updated so that the data of the data portion 1300 is put onto the common data bus 302 through the register 1301 and the copy-back processing is executed. The address obtained by merging the output of the encoder 1204 and the bits 20–31 of the physical address 1005 is used as the index address of the cache data portion 1300 at this time. When the copy-back processing is complete, the status of the block is changed to Exclusive.

When the data corresponding to the monitored physical address 1005 does not exist inside the cache memory, the bus monitor 1500 asserts only the BCKACK signal 1508 and sends back the response to the memory causing the block transfer start.

As is obvious from the foregoing embodiments, in the uni-processor system which employs the multiple virtual storage system, the cache memories are accessed by the logical address and the common bus structure of the physical address is used; therefore, the present invention can solve the problem of "Address Synonym", which becomes the problem when the different logic addresses share the same physical data, without providing the inverse conversion table for converting the physical address to the logical address and without making the management of the link information which associates the physical address tag with the logical address tag. Furthermore, the multiprocessor system which employs the multiple virtual storage system has cache memories which are accessed by the logical address and the common bus structure of the physical address is employed; therefore, the present invention can accomplish the coincidence assurance of the cache memories without using the inverse conversion table and the management of the link information. Accordingly, the present invention can reduce the hardware quantity and the complicated procedures for managing the inverse conversion table or the link information.

What is claimed is:

1. A logical cache memory for a multiprocessor system having a main storage accessed from a plurality of arithmetic units, wherein the logical cache memory is accessed by a logical address from one of the arithmetic processing units, said logical cache memory comprising:

address converting means for converting a logical address received from said one arithmetic processing unit into a corresponding physical address, which is used to access said main storage;

a logical address register for storing a logical address of data to be accessed, wherein said logical address is composed of a most significant bit portion and an intermediate bit portion and a least significant bit portion said most significant bit portion and said intermediate bit portion are affected by said address converting means, said least significant bit portion is not affected by said address converting means;

a physical address register for storing a physical address to be checked, wherein said physical address is composed of a most significant bit portion and a least significant bit portion, said most significant bit portion is affected by said address converting means, said least significant bit portion is not affected by said address converting means;

a data storage portion, which is addressed by said intermediate bit portion and said least significant bit portion of said received logical address register, for holding a part of the data stored in said main storage, a logical tag memory, which is addressed by said intermediate bit portion and said least significant bit portion of said received logical address register, for holding the most significant bit portion of said logical address corresponding to data stored in said data storage portion;

a plurality of physical tag memories, which are addressed by a least significant bit portion of a physical address received in said physical address register, for holding said least significant bit portion of said physical address corresponding to data stored in said data storage portion, wherein said plurality of physical tag memories are accessed in parallel;

first judgement means for judging whether requested data exists in said data storage portion by comparing a selected most significant bit portion in said logical tag memory with said most significant bit portion in said logical address register; and second judgement means for judging whether or not requested data exists in said data storage portion by comparing a selected most significant bit portions in said plurality of physical tag memories with said most significant bit portion in said physical address register.

2. A logical cache memory according to claim 1, wherein said second judgement means has a plurality of comparators for comparing the read outputs read out simultaneously from said plurality of physical tag memories with said most significant bit portion of said physical address register, and an encoder for converting the output of a plurality of said comparators to an encoded address, wherein said encoded address is merged with said least significant bit portion of said physical address register and becomes an access address of said data storage portion for output.

3. A logical cache memory according to claim 2, wherein the output encoded address of said encoder are merged with said least significant bit portion of said physical address register and becomes an access of said logical tag memory through a selector.

* * * * *

UNITED STATES PATENT AND TRADEMARK OFFICE
CERTIFICATE OF CORRECTION

PATENT NO. : 5,623,626
DATED : April 22, 1997
INVENTOR(S) : MORIOKA et al

It is certified that error appears in the above-indentified patent and that said Letters Patent is hereby corrected as shown below:

On the Title Page, Left-hand column, after "[63]" Please delete "Serial No. 159,222, Feb. 13, 1988" and Insert: --Serial No. 159,222, Feb. 23, 1988--

Signed and Sealed this

Twenty-fourth Day of February, 1998

Attest:

BRUCE LEHMAN

*Attesting Officer*  *Commissioner of Patents and Trademarks*